United States Patent
Matsuyama et al.

(10) Patent No.: US 10,280,321 B2
(45) Date of Patent: May 7, 2019

(54) INK, INK CONTAINER, INKJET RECORDING DEVICE, AND RECORDED MATTER

(71) Applicants: Akihiko Matsuyama, Shizuoka (JP); Hiroshi Gotou, Shizouka (JP); Michihiko Namba, Kanagawa (JP); Hidetoshi Fujii, Kanagawa (JP); Amika Sagara, Tokyo (JP); Kazukiyo Nagai, Shizuoka (JP); Tomoyuki Shimada, Shizuoka (JP); Shigeyuki Harada, Shizuoka (JP); Yoshiki Yanagawa, Shizuoka (JP); Akiyoshi Sabu, Shizuoka (JP); Yuusuke Koizuka, Shizuoka (JP); Masayuki Fukuoka, Tokyo (JP); Takuya Yamazaki, Shizuoka (JP)

(72) Inventors: Akihiko Matsuyama, Shizuoka (JP); Hiroshi Gotou, Shizouka (JP); Michihiko Namba, Kanagawa (JP); Hidetoshi Fujii, Kanagawa (JP); Amika Sagara, Tokyo (JP); Kazukiyo Nagai, Shizuoka (JP); Tomoyuki Shimada, Shizuoka (JP); Shigeyuki Harada, Shizuoka (JP); Yoshiki Yanagawa, Shizuoka (JP); Akiyoshi Sabu, Shizuoka (JP); Yuusuke Koizuka, Shizuoka (JP); Masayuki Fukuoka, Tokyo (JP); Takuya Yamazaki, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 441 days.

(21) Appl. No.: 15/001,829

(22) Filed: Jan. 20, 2016

(65) Prior Publication Data

US 2016/0222234 A1    Aug. 4, 2016

(30) Foreign Application Priority Data

Jan. 29, 2015 (JP) .................................. 2015-015270
May 22, 2015 (JP) .................................. 2015-104663

(51) Int. Cl.
  *C09D 11/322* (2014.01)
  *C09D 11/10* (2014.01)
  *C09D 11/12* (2006.01)

(52) U.S. Cl.
  CPC ............ *C09D 11/322* (2013.01); *C09D 11/10* (2013.01); *C09D 11/12* (2013.01)

(58) Field of Classification Search
  CPC ....... C09D 11/30; C09D 11/322; C09D 11/10; C09D 11/12
  (Continued)

(56) References Cited

U.S. PATENT DOCUMENTS 6,433,117 B1 *  8/2002  Ma ........................... C08F 2/22
                                                       106/31.13
2005/0054751 A1  3/2005  Namba et al.
(Continued)

FOREIGN PATENT DOCUMENTS

JP   2003-147241    5/2003
JP   2003-261805    9/2003
(Continued)

OTHER PUBLICATIONS

Machine Translation of JP 2013-129688 (Obtained Apr. 28, 2018).*
(Continued)

*Primary Examiner* — Coris Fung
*Assistant Examiner* — Sathavaram I Reddy
(74) *Attorney, Agent, or Firm* — Oblon, McClelland, Maier & Neustadt, L.L.P.

(57) ABSTRACT

An ink includes a pigment, a wax, a water soluble solvent including a solvent having an SP value of from 9.0 to 11.0,
(Continued)

and water, wherein the mass ratio of the content of the wax in the ink to the content of the solvent having an SP value of from 9.0 to 11.0 is in a range of from 1.0:2.5 to 1.0:25.0.

19 Claims, 3 Drawing Sheets

(58) Field of Classification Search
USPC .......................................................... 428/207
See application file for complete search history.

(56) References Cited

U.S. PATENT DOCUMENTS

| | | | |
|---|---|---|---|
| 2005/0231575 A1 | 10/2005 | Bannai et al. | |
| 2006/0160924 A1* | 7/2006 | Kakuchi | C09D 11/30 523/160 |
| 2007/0197685 A1 | 8/2007 | Aruga et al. | |
| 2007/0221078 A1 | 9/2007 | Namba et al. | |
| 2008/0070008 A1 | 3/2008 | Namba et al. | |
| 2008/0092773 A1 | 4/2008 | Matsuyama | |
| 2008/0248260 A1 | 10/2008 | Kojima et al. | |
| 2009/0035468 A1 | 2/2009 | Matsuyama et al. | |
| 2009/0098312 A1 | 4/2009 | Goto et al. | |
| 2009/0176070 A1 | 7/2009 | Goto et al. | |
| 2009/0239044 A1 | 9/2009 | Habashi et al. | |
| 2009/0263632 A1 | 10/2009 | Kojima et al. | |
| 2011/0216123 A1 | 9/2011 | Tamai et al. | |
| 2011/0300353 A1 | 12/2011 | Habashi et al. | |
| 2011/0310166 A1 | 12/2011 | Namba et al. | |
| 2011/0318543 A1 | 12/2011 | Goto | |
| 2012/0026239 A1* | 2/2012 | Yanagi | C09D 11/322 347/21 |
| 2012/0113195 A1* | 5/2012 | Katsuragi | C09D 11/38 347/86 |
| 2012/0128949 A1 | 5/2012 | Goto | |
| 2012/0207983 A1 | 8/2012 | Matsuyama et al. | |
| 2012/0236066 A1 | 9/2012 | Tamai et al. | |
| 2012/0293582 A1 | 11/2012 | Goto et al. | |
| 2012/0320133 A1 | 12/2012 | Namba et al. | |
| 2012/0320137 A1 | 12/2012 | Fujii et al. | |
| 2012/0328853 A1 | 12/2012 | Matsuyama et al. | |
| 2012/0328854 A1 | 12/2012 | Matsuyama et al. | |
| 2013/0002776 A1 | 1/2013 | Nagashima et al. | |
| 2013/0023614 A1 | 1/2013 | Hatada et al. | |
| 2013/0065028 A1 | 3/2013 | Fujii et al. | |
| 2013/0070017 A1 | 3/2013 | Fujii et al. | |
| 2013/0071637 A1 | 3/2013 | Matsuyama et al. | |
| 2013/0101814 A1 | 4/2013 | Gotou et al. | |
| 2013/0113860 A1 | 5/2013 | Gotou et al. | |
| 2013/0143008 A1 | 6/2013 | Gotou et al. | |
| 2013/0155145 A1 | 6/2013 | Gotou et al. | |
| 2013/0169724 A1 | 7/2013 | Gotou | |
| 2013/0176369 A1 | 7/2013 | Gotou et al. | |
| 2013/0194343 A1 | 8/2013 | Yokohama et al. | |
| 2013/0194344 A1 | 8/2013 | Yokohama et al. | |
| 2013/0194345 A1 | 8/2013 | Tamai et al. | |
| 2013/0201252 A1 | 8/2013 | Namba | |
| 2013/0321525 A1 | 12/2013 | Fujii et al. | |
| 2013/0323474 A1 | 12/2013 | Gotou et al. | |
| 2014/0002539 A1 | 1/2014 | Goto et al. | |
| 2014/0017461 A1 | 1/2014 | Matsuyama | |
| 2014/0065386 A1 | 3/2014 | Matsuyama | |
| 2014/0069295 A1 | 3/2014 | Fujii et al. | |
| 2014/0072779 A1 | 3/2014 | Matsuyama et al. | |
| 2014/0120331 A1 | 5/2014 | Koizuka et al. | |
| 2014/0141209 A1 | 5/2014 | Koizuka et al. | |
| 2014/0192112 A1 | 7/2014 | Nagashima et al. | |
| 2014/0192121 A1 | 7/2014 | Bannai et al. | |
| 2014/0198160 A1 | 7/2014 | Harada et al. | |
| 2014/0199530 A1 | 7/2014 | Katoh et al. | |
| 2014/0204156 A1 | 7/2014 | Gotou | |
| 2014/0240391 A1 | 8/2014 | Goto et al. | |
| 2014/0242352 A1 | 8/2014 | Naruse et al. | |
| 2014/0253631 A1 | 9/2014 | Namba et al. | |
| 2014/0267516 A1 | 9/2014 | Nonogaki et al. | |
| 2014/0275401 A1 | 9/2014 | Katoh et al. | |
| 2014/0368572 A1 | 12/2014 | Goto | |
| 2015/0030818 A1 | 1/2015 | Fujii et al. | |
| 2015/0035896 A1 | 2/2015 | Gotou et al. | |
| 2015/0056425 A1 | 2/2015 | Nagai et al. | |
| 2015/0064418 A1 | 3/2015 | Matsuyama et al. | |
| 2015/0064425 A1 | 3/2015 | Matsuyama et al. | |
| 2015/0077480 A1 | 3/2015 | Fujii et al. | |
| 2015/0079358 A1 | 3/2015 | Gotou et al. | |
| 2015/0103116 A1 | 4/2015 | Gotou | |
| 2015/0109382 A1 | 4/2015 | Naruse et al. | |
| 2015/0116421 A1 | 4/2015 | Nonogaki et al. | |
| 2015/0125672 A1 | 5/2015 | Katoh et al. | |
| 2015/0174920 A1 | 6/2015 | Namba et al. | |
| 2015/0247047 A1 | 9/2015 | Matsuyama | |
| 2015/0247049 A1 | 9/2015 | Matsuyama et al. | |
| 2015/0252203 A1 | 9/2015 | Matsuyama et al. | |
| 2015/0258796 A1 | 9/2015 | Tamai et al. | |
| 2015/0259555 A1 | 9/2015 | Katoh et al. | |
| 2015/0259567 A1 | 9/2015 | Tamai et al. | |
| 2015/0283828 A1 | 10/2015 | Aoai et al. | |
| 2015/0291817 A1 | 10/2015 | Katoh et al. | |
| 2015/0307729 A1 | 10/2015 | Gotou et al. | |
| 2015/0307734 A1 | 10/2015 | Nonogaki et al. | |
| 2015/0367667 A1 | 12/2015 | Aoai et al. | |
| 2015/0376425 A1 | 12/2015 | Hakiri et al. | |

FOREIGN PATENT DOCUMENTS

| | | |
|---|---|---|
| JP | 2007-091906 | 4/2007 |
| JP | 2009-291976 | 12/2009 |
| JP | 2010-510357 | 4/2010 |
| JP | 2011-105866 | 6/2011 |
| JP | 2011-201063 | 10/2011 |
| JP | 2012-171988 | 9/2012 |
| JP | 2013129688 A * | 7/2013 |
| JP | 2013-185109 | 9/2013 |
| JP | 2014-031504 | 2/2014 |
| JP | 2014-058626 | 4/2014 |
| JP | 2014-065890 | 4/2014 |
| JP | 2014-101436 | 6/2014 |
| JP | 2014-114409 | 6/2014 |
| JP | 2014-173080 | 9/2014 |
| WO | WO2007/053563 A2 | 5/2007 |
| WO | WO2008/064108 A1 | 5/2008 |
| WO | WO2011/093486 A1 | 8/2011 |

OTHER PUBLICATIONS

U.S. Appl. No. 14/739,114, filed Jun. 15, 2015.
U.S. Appl. No. 14/793,981, filed Jul. 8, 2015.
U.S. Appl. No. 14/800,064, filed Jul. 15, 2015.
U.S. Appl. No. 14/840,570, filed Aug. 31, 2015.
U.S. Appl. No. 14/852,724, filed Sep. 14, 2015.
Office Action dated Oct. 18, 2018, in corresponding Japanese Patent Application No. 2015-104663 (Dispatch No. 446792) (References AO, AP, AQ, AR, AS, and AT are cited therein).

* cited by examiner

INK, INK CONTAINER, INKJET RECORDING DEVICE, AND RECORDED MATTER

CROSS-REFERENCE TO RELATED APPLICATIONS

This patent application is based on and claims priority pursuant to 35 U.S.C. § 119(a) to Japanese Patent Application Nos. 2015-015270 and 2015-104663, filed on Jan. 29, 2015 and May 22, 2015, respectively, in the Japan Patent Office, the entire disclosures of which are hereby incorporated by reference herein.

BACKGROUND

Technical Field

The present invention relates to an ink, an ink container, an inkjet recording device, and recorded matter.

Background Art

Inkjet printers have been drastically diffusing because of their advantages such as low acoustic noises and low running costs and printers capable of printing color images on plain paper are introduced into the market actively. However, it is extremely difficult to satisfy the demanded levels of properties such as color reproducibility of an image, abrasion resistance, durability, light resistance, dryness of an image, feathering, color bleed, duplex printing, and discharging stability. Accordingly, inks are selected depending on properties prioritized to a particular application in fact.

Image density and saturation have been improved and now is close to the quality of printing and electrophotography. However, pigments stay around the surface of plain paper, which causes a new problem that the fixability of an image deteriorates because the pigments on the surface easily come off.

In an attempt to improve the fixability, wax is added to an ink. The wax makes the surface of an image lubricant. This is better to significantly improve fixability in some cases, particularly when a large quantity of pigments are present on the surface, than a method of improving binding property by adding a large amount of resins. However, wax is melted or transformed upon application of heat or a strong force so that the wax may lose solubility in water. Wax that has lost water solubility easily adheres around in particular the nozzles located inside of a head that receives heat and a force. This leads to diversion of discharging.

SUMMARY

According to the present disclosure, provided is an improved ink including a pigment, a wax, a water soluble solvent including a solvent having an SP value of from 9.0 to 11.0, and water, wherein the mass ratio of the content of the wax in the ink to the content of the solvent having an SP value of from 9.0 to 11.0 is in a range of from 1.0:2.5 to 1.0:25.0.

BRIEF DESCRIPTION OF THE SEVERAL VIEWS OF THE DRAWINGS

Various other objects, features and attendant advantages of the present invention will be more fully appreciated as the same become better understood from the detailed description when considered in connection with the accompanying drawings, in which like reference characters designate like corresponding parts throughout and wherein.

DETAILED DESCRIPTION

Figure 1:
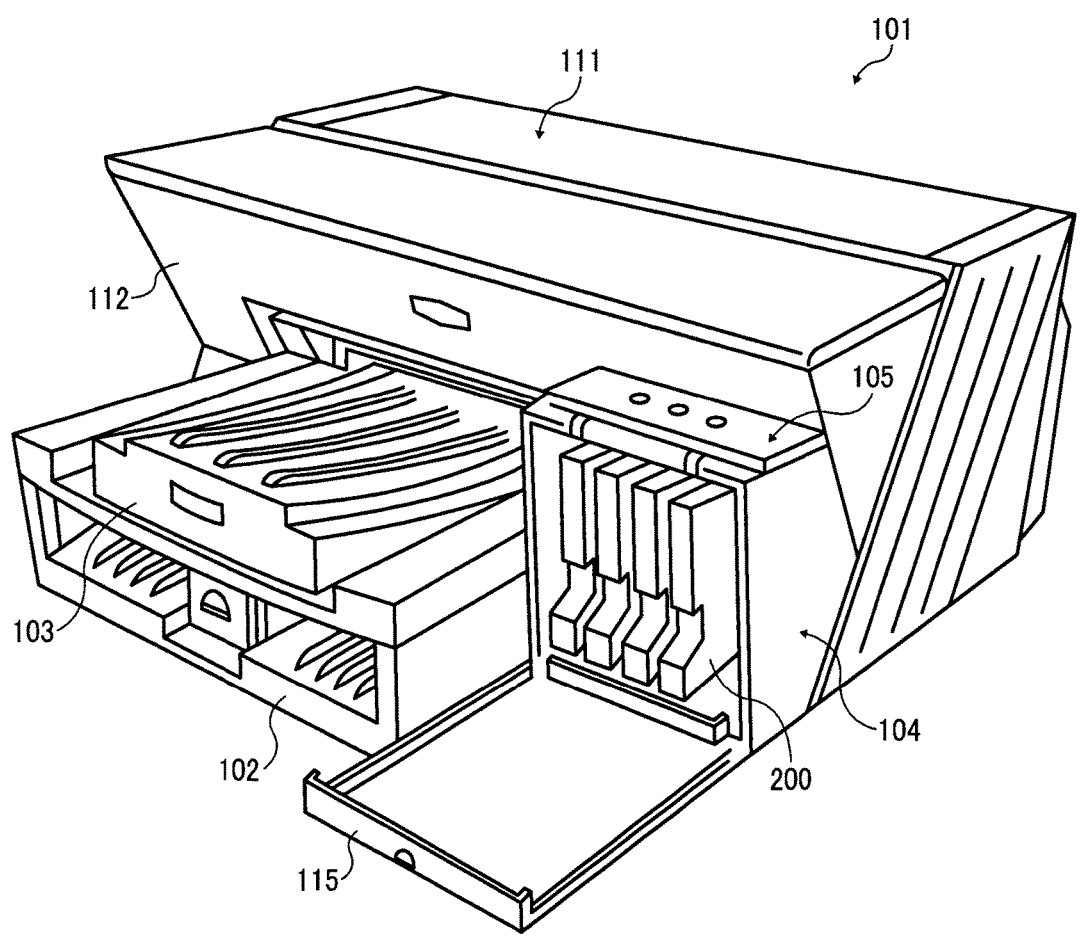
FIG. 1 is a perspective diagram illustrating an example of the inkjet recording device according to an embodiment of the present invention in which the cover of the ink container installation unit is open.

The present invention is described in detail with reference to accompanying drawings.

The present invention is to provide an ink that improves the fixability on plain paper, which is not satisfied by typical pigment inks, imparts excellent abrasion resistance to an image having a high density and a high saturation while having excellent storage stability and discharging stability.

The ink of the present disclosure contains a pigment, a wax, a water soluble solvent, and water as components.

The water soluble solvent has an SP value of from 9.0 to 11.0.

In addition, the mass ratio of the content of the wax in the ink to the content of the solvent having an SP value of from 9.0 to 11.0 is in a range of from 1.0:2.5 to 1.0:25.0.

Each component of the ink is described below.

Water Soluble Solvent

The ink of the present disclosure is prepared by using water as a liquid medium. A water soluble solvent and a wetting agent are used in combination to prevent ink from drying, improve the dispersion stability, and prevent curling of plain paper. The water soluble solvent in the present disclosure means a liquid material at room temperature other than water and soluble in water even a little. In addition, the wetting agent in the present disclosure represents a material having moisture absorption and water absorbability at room temperature. Specific examples of such water soluble solvents and wetting agents include, but are not limited to, the following. These can be used alone or in combination.

Polyols such as glycerin, ethylene glycol, diethylene glycol, isopropylidene glycerol, 1,3-butane diol, 3-methyl-1,3-butane diol, tri ethylene glycol, propylene glycol, dipropylene glycol, trimethylol propane, trimethylol ethane, ethyene glycol, diethylene glycol, dipropylene glycol, tripropylene glycol, tetraethylene glycol, hexylene glycol, polyethylene glycol, polypropylene glycol, methyltriglycol, 1,5-pentane diol, 1,2-hexane diol, 1,6-hexane diol, glycerol, 1,2,6-hexane triol, 1,2,4-butanetriol, 1,2,3-butanetriol, petriol, 3-methoxy-1-butanol, 2-ethyl-1,3-hexanediol, and 2,2,4-trimethyl-1,3-pentanediol;

Polyol alkyl ethers such as ethylene glycol monoethyl ether, ethylene glycol monobutyl ether, diethylene glycol monomethyl ether, diethylene glycol monoethyl ether, diethylene glycol monobutyl ether, tetraethylene glycol monomethyl ether, propylene glycol monoethyl ether, dipropyleneglycol monopropyle ether, and tripropyl eneglycol monomethyl ether;

Polyol aryl ethers such as ethylene glycol monophenyl ether and ethylene glycol monobenzyl ether;

Nitrogen-containing heterocyclic compounds such as 2-pyrolidone, N-methyl-2-pyrolidone, N-hydroxyethyl-2-pyrolidone, 1,3-dimethylimidazoline, ε-caprolactam, and γ-butylolactone.;

Amides such as formamide, N-methyl formamide, N,N-dimethyl formamide, N,N-dimethyl-β-methoxy propionamide, and N,N-dimethyl-β-butoxy propionamide;

Amines such as monoethanol amine, diethanol amine, triethanol amine, monoethyl amine, diethylamine, and triethyl amine;

Sulfur-containing compounds such as dimethyl sulfoxide, sulfolane, and thiodiethanol; 3-ethyl-3-hydroxymethyl oxetane, propylene carbonate, and ethylene carbonate.

In addition to those mentioned above, sugar can be used as the water soluble solvent or the wetting agent. Specific examples of the sugar groups include, but are not limited to, monosaccharides, disaccharides, oligosaccharides (including trisaccharides and tetrasaccharides), and polysaccharides.

Preferred specific examples thereof include, but are not limited to, glucose, mannose, fructose, ribose, xylose, arabinose, galactose, maltose, cellobiose, lactose, saccharose, trehalose, and maltotriose. Polysaccharides represent sugar in a broad sense and contain materials that are present widely in nature, for example, α-cyclodextrine and cellulose.

Specific examples of derivatives of these sugar groups include, but are not limited to, reducing sugars, oxidized sugars, amino acid, and thio acid for the sugar groups specified above. Sugar alcohols are particularly preferable and specific examples thereof include, but are not limited to, maltitol and sorbit.

The ratio of the pigment to the water soluble agent and the wetting agent has an impact on the discharging stability of an ink discharged from a head. If the blending amount of the water soluble agent and the wetting agent is small while the ratio of the solid pigment portion is high, water evaporation around ink meniscus of nozzles tends to be accelerated, resulting in bad discharging performance. The blending ratio of the water soluble agent and the wetting agent is preferably from 10 percent by mass to 70 percent by mass and more preferably from 20 percent by mass to 50 percent by mass based on the entire ink. The ink having such a content ratio is extremely good about drying property and the test for storage and reliability.

SP Value

The SP value means a dissolution parameter and is used in general as an index for affinity and solubility of materials such as a solvent, a resin, and a pigment dissolved or dispersed in water or a solvent for use. The SP value can be obtained by various ways such as measuring by experiments, calculating by measuring physical property such as immersion heat, or calculating from molecular structures. In the present disclosure, the SP value is obtained by the calculation method based on the molecule structure proposed by Fedors. This method has advantages that the SP value can be calculated if a molecule structure is known and the difference between the SP value obtained from this method and the measuring value based on experiments is small. In the Method of Fedors, the evaporation energy $\Delta e_i$ and the mol volume $\Delta v_i$ of each atom and atom group at 25 degrees C. are defined as in the following Table 1 and the values are assigned to the following relation A to obtain the SP value.

In the present disclosure, according to the Method of Fedors, the SP value calculated from the molecular structure is used and represented in $(cal/cm^3)^{1/2}$.

Also, in the present disclosure, the SP value at 25 degrees C. is used and not subject to temperature conversion, etc.

$$SP \text{ value} = \left(\frac{\Delta E}{V}\right)^{1/2} = \left(\frac{\sum_i \Delta e_i}{\sum_i \Delta v_i}\right)^{1/2} \quad (A)$$

In the relation A, $\Delta E$ represents agglomeration energy density, V represents mol volume, $\Delta e_i$ represent the evaporation energy of atom or atom group, and $\Delta v_i$ represents mol volume of atom or atom group.

For example, the SP value of isopropylidene glycerol (iPDG) is calculated from the values shown in Table 1 as follows.

SP value=$(14610/151)^{1/2}$=9.8$(cal/cm^3)^{1/2}$

TABLE 1

| Atom group | $\Delta e_i$ (cal/mol) | $\Delta v_i$ (cm³/mol) | iPDG Number of Atom groups | Sum of $\Delta e_i$ (cal/mol) | Sum of $\Delta v_i$ (cm³/mol) |
|---|---|---|---|---|---|
| —CH₃— | 1125 | 33.5 | 2 | 2250 | 67.0 |
| —CH₂— | 1180 | 16.1 | 4 | 4720 | 64.4 |
| —CH— | 820 | −1.0 | 1 | 820 | −1.0 |
| —O— | 800 | 3.8 | 2 | 1600 | 7.6 |
| —OH (adjacent to C atom) | 5220 | 13.0 | 1 | 5220 | 13.0 |
| Total | | | | 14610 | 151.0 |

The ink of the present disclosure contains a water soluble solvent having an SP value of from 9.0 to 11.0. When the SP value is within this range, the compatibility between the ink and was is improved, thereby improving storage stability. Accordingly, when the ink dries in a nozzle or therearound, the was down precipitate, so that the discharging performance is stable.

Specific examples of the water soluble solvents having an SP value of from 9.0 to 11.0 include, but are not limited to, isopropylidene glycerol (SP value: 9.8), 3-ethyl-3-hydroxymethyloxetane (SP value: 10.7), N,N-dimethyl-β-butoxypropionamide (SP value: 9.8), N,N-dimethyl-β-methoxypropionamide (SP value: 10.3), methyltriglycol (SP value: 10.1), 3-methoxy-1-butanol (SP value: 10.0), dipropylene glycolmonopropylether (SP value: 9.5), and tripropylene glycol monomethylether (SP value: 9.4). It is preferably at least one of the solvents selected from the group consisting of isopropylidene glycerol (SP value: 9.8), 3--ethyl-3-hydroxymethyloxetane (SP value: 10.7), N,N-dimethyl-β-butoxypropionamide (SP value: 9.8), and N,N-dimethyl-β-methoxypropionamide (SP value: 10.3).

The blending ratio of the water soluble solvent having an SP value of from 9.0 to 11.0 is preferably 70 percent by mass to the total of an ink and more preferably from 10 percent by mass to 40 percent by mass. The ink having such a ratio is extremely good about the tests for storage and reliability.

In addition, it is preferable that the water soluble solvent having an SP value of from 9.0 to 11.0 accounts for 80 percent by mass in the total amount of the water soluble solvents contained in the ink.

When the water soluble solvent having an SP value of from 9.0 to 11.0 accounts for 80 percent by mass in the total amount of the water soluble solvents contained in the ink, the ink storage stability and discharging stability furthermore ameliorate.

If a pigment stays around the surface of a recording medium to enhance the image density and saturation, a problem arises that the pigment easily comes off by abrading an image thereon and contaminates around the image. This problem is prevented by adding a wax.

However, if a wax having a low compatibility with water is added, a pigment tends to adhere around a nozzle, causing diversion of discharging or non-discharging.

It is possible to stably discharge an ink without causing a wax to precipitate by using the water soluble solvent having an SP value of from 9.0 to 11.0.

Wax

The ink of the present disclosure contains a wax. The wax can be water soluble or water dispersible. As the water soluble wax, it is suitable to use waxes having a hydrophilic group such as a hydroxyl group, a carboxyl group, an ethylene oxide group, and an amine group. In addition, as the water dispersible wax, it is possible to use a wax emulsion.

Specific examples thereof include, but are not limited to, plant waxes or animal waxes such as carnauba wax, candelilla wax, bees wax, rice wax, and lanolin, oil waxes such as paraffin wax, microcrystalline wax, polyethylene wax, polypropylene wax, polyethylene oxide wax, and petrolatum, mineral waxes such as montan wax and ozocerite, synthetic waxes such as carbon wax, hechist wax, polyethylene wax, and stearic acid amide, natural S synthetic wax emulsion of copolymers of a olefin and maleic anhydride, etc., or blending waxes. These can be used alone or in combination. In addition, latex, colloid solutions, suspension liquids can be used. In the present disclosure, polyethylene wax is preferable in terms of solubility and dispersibility in the water soluble solvents.

These waxes are also available on market. Specific examples thereof include, but are not limited to, Selosol 524 (carnauba wax, melting point: 83 degrees C., particle diameter: 200 nm, manufactured by CHUKYO YUSHI CO., LTD.), HYTEC-E-6500 (polyethylene wax, melting point: 140 degrees C., particle diameter: 60 nm, manufactured by TOHO Chemical Industry Co., Ltd.), HYTEC E-8237 (polyethylene wax, melting point: 106 degrees C., particle diameter: 80 nm, manufactured by TOHO Chemical Industry Co., Ltd.), HYTEC P-9018 (polypropylene wax, melting point: 156 degrees C., particle diameter: 60 nm, manufactured by TOHO Chemical Industry Co., Ltd.), Nopcoat PEM-17 (polyolefin wax, melting point: 105 degrees C., particle diameter: 10 nm, manufactured by SAN NOPCO LIMITED), AQUACER 498 (paraffin-based wax, melting point: 58 degrees C., manufactured by Byc Chemie Japan), AQUACER 535 (mixing-based wax, melting point: 95 degrees C., manufactured by Byc Chemie Japan), AQUACER 531 (polyethylne wax, melting point: 130 degrees C., particle diameter: 123 nm, manufactured by Byc Chemie Japan), and AQUACER 515 (polyethylne wax, melting point: 135 degrees C., particle diameter: 33 nm, manufactured by Byc Chemie Japan).

The melting point of the wax is preferably from 70 degrees C. to 170 degrees C. and more preferably from 100 degrees C. to 140 degrees C. When the melting point is 70 degrees C. or higher, obtained images is not sticky, so that image transfer does not occur when images are overlapped. When the melting point is 170 degrees C. or lower, the wax melts by friction heat when obtained images are abraded. That is, good slippage is obtained, thereby improving abrasion durability of the images.

The volume average particle diameter of the wax is preferably 200 nm or less and more preferably from 20 nm to 150 nm. When the volume average particle diameter is 200 nm or less, the wax does not stack in a nozzle or a filter in a head and good dischargeability is obtained.

The content of a wax to an ink is preferably from 0.1 percent by mass to 5 percent by mass and more preferably from 0.5 percent by mass to 2% by mass. When the content of a wax is 0.1 percent by mass or greater, slippage is imparted to the surface of a printed image so that abrasion resistance thereof can be maintained high. In addition, when the content is 5 percent by mass or less, the wax can be dissolved or dispersed in a water soluble solvent in an ink so that the wax does not adhere to a head, which leads to good dischargeability of ink droplets.

The ratio of the content of the wax in the ink of the present disclosure to the solvent having an SP value of from 9.0 to 11.0 is in the range of from 1.0:2.5 to 1.0:25.0 and preferably from 1.0:10.0 to 1.0:24.0. Within this ratio, the amount of the solvent enclosing the wax particles is just enough to obtain sufficient storage stability and discharging stability.

When the solvent is less than the ratio of 1.0:2.5, the storage stability deteriorates and the wax tends to precipitate at a nozzle mouth, which causes bad discharging performance. When the ratio of the solvent is greater than 1.0:25.0, the wax dispersed in an ink is dissolved in the solvent and accordingly the viscosity increases, which leads to degrade dischargeability and storage stability.

Permeating Agent

By adding a permeating agent to an ink, the surface tension lowers so that the ink filling property of the ink to nozzles and discharging stability ameliorate. In addition, since ink droplets quickly permeates into a recording medium after the ink droplets have landed thereon, feathering and color bleed are reduced.

Surfactants and solvents having a permeating property are used as the permeating (penetrating) agent.

The surfactants are classified into anionic surfactants, nonionic surfactants, and ampholytic surfactants by hydrophilic group or fluorine-based surfactants, acetylene-based surfactants, etc. by hydrophobic group.

Specific examples of the anionic surfactants include, but are not limited to, polyoxyethylene alkyl ether acetates, dodecyl benzene sulfonates, laurates, and polyoxyethylene alkyl ether sulfates.

Specific examples of the nonionic surfactants include, but are not limited to, polyols, glycol ethers, polyoxyethylene alkyl ethers, polyoxyethylene alkyl esters, polyoxy ethylene sorbitan aliphatic esters, polyoxyethylene alkyl phenyl ethers, polyoxyethylene alkyl amines, polyoxyethylene alkyl amides, and acetylene glycol.

Specific examples of the fluorine-based surfactants include, but are not limited to, perfluoroalkyl sulfonic acid salts, perfluoroalkyl carboxylic acid salts, perfluoroalkyl phosphoric acid esters, adducts of perfluoroalkyl ethylene oxide, perfluoro alkyl betaine, perfluoro alkyl amine oxide, and perfluoro alkyl ether compounds. The fluorine-containing surfactant represented by the following Chemical formula 1 and/or Chemical formula 2 is suitably used.

Chemical formula 1

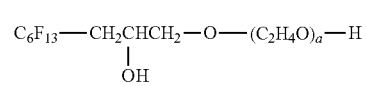

$$C_6F_{13}-CH_2CHCH_2-O-(C_2H_4O)_a-H$$
$$|$$
$$OH$$

In the Chemical formula 1, a represents a numeral in a range of from 8 to 9.

Chemical formula 2

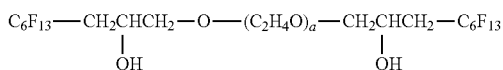

In the Chemical formula 2, a represents a numeral in a range of from 8 to 9.

Specific examples of the acetylene glycol-based surfactants include, but are not limited to, acetylene glycols such as 2,4,7,9-tetramethyl-5-desine-4,7-diol, 3,6-dimethyl-4-octine-3,6-diol, and 3,5-dimethyl-1-hexine-3-ol {(for example, SURFYNOL® 104, 82, 465, 485, and TG, manufactured by AIR PRODUCTS and CHEMICALS, INC. (US)}. Of these, SURFYNOL® 104, 465, and TG are particularly good to demonstrate good printing quality.

Specific examples of the solvents having a permeating property include, but are not limited to, polyols having eight or more carbon atoms such as 2-ethyl-1,3-hexane diol, and 2,2,4-trimethyl-1,3-pentane diol and glycol ethers.

These surfactants may be used alone or in combination.

The content of the penetrating agent to the entire ink is preferably from 0.01% percent by mass to 5 percent by mass, more preferably from 0.03 percent by mass to 2 percent by mass. When the amount of the surfactant is 0.01 percent by mass or greater, dots sufficiently spread after printing, thereby covering the entire of an image with the dots. As a result, image density and saturation are maintained high. In addition, when the content is 5 percent by mass or less, an ink does not easily bubble, so that the flow path in a nozzle is not blocked by the bubbles, which leads to good dischargeability of ink droplets.

Pigment

The pigments are not particularly limited and suitably selected to a particular application. For example, inorganic pigments or organic pigments for black or color are suitably used. These can be used alone or in combination.

As the inorganic pigments, for example, it is possible to use carbon black manufactured by known methods such as contact methods, furnace methods, and thermal methods in addition to titanium oxide, iron oxide, calcium oxide, barium sulfate, aluminum hydroxide, barium yellow, cadmium red, and chrome yellow.

Specific examples of the organic pigments include, but are not limited to, azo pigments, azomethine pigments, polycyclic pigments, dye chelates, nitoro pigments, nitroso pigments, and aniline black. Of these, azo pigments and polycyclic pigments are more preferable.

Specific examples of the azo pigments include, but are not limited to, azo lake, insoluble azo pigments, condensation azo pigments, and chelate azo pigments.

Specific examples of the polycyclic pigments include, but are not limited to, phthalocyanine pigments, perylene pigments, perinone pigments, anthraquinone pigments, quinacridone pigments, dioxazine pigments, indigo pigments, thioindigo pigments, isoindolinone pigments, quinofuranone pigments, and, Rhodamine B lake pigments.

The dye chelates include, but are not limited to, base dye type chelates, and acid dye type chelates.

Specific examples of the black pigments include, but are not limited to, carbon black (C.I. Pigment Black 7) such as furnace black, lamp black, acetylene black, and channel black, metals such as copper, iron (C.I. Pigment Black 11), and titanium oxides, and organic pigments such as aniline black (C.I. Pigment Black 1).

It is suitable to use carbon black which is manufactured by a furnace method or channel method and has a primary particle diameter of from 15 nm to 40 nm, a specific surface area of from 50 m$^2$/g to 300 m$^2$/g according to Brun-auer-Emmett-Teller (BET) method, a dibutylphthalate (DPB) absorption oil amount of from 40 ml/100 g to 150 ml/100 g, a volatile content of from 0.5 percent to 10 percent, and pH of from 2 to 9.

Specific examples of carbon black available on market include, but are not limited to, No. 2300, No. 900, MCF-88, No. 33, No. 40, No. 45, No. 52, MA7, MA8, MA100, No. 2200B (all manufactured by Mitsubishi Chemical Corporation); Raven 700, Raven 5750, Raven 5250, Raven 5000, Raven 3500, and Raven 1255 (all manufactured by Colombia Co., Ltd.), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all manufactured by Cabot Corporation); and Color Black FW1, Color Black FW2, Color Black FW2V, Color Black FW 18, Color Black 200, Color Black S150, Color Black S160, Color Black S170, Printex 35, Printex U, Printex V, Printex 140U, Printex 140V, and Special Black 6, Special Black 5, Special Black 4A, and Special Black 4 (all manufactured by Degussa AG).

The pigment for use in yellow ink is not particularly limited and can be suitably selected to a particular application. Specific examples thereof include, but are not limited to, C.I. Pigment Yellow 1, C.I. Pigment Yellow 2, C.I. Pigment Yellow 3, C.I. Pigment Yellow 12, C.I. Pigment Yellow 13, C.I. Pigment Yellow 14, C.I. Pigment Yellow 16, C.I. Pigment Yellow 17, C.I. Pigment Yellow 73, C.I. Pigment Yellow 74, C.I. Pigment Yellow 75, C.I. Pigment Yellow 83, C.I. Pigment Yellow 93, C.I. Pigment Yellow 95, C.I. Pigment Yellow 97, C.I. Pigment Yellow 98, C.I. Pigment Yellow 114, C.I. Pigment Yellow 120, C.I. Pigment Yellow 128, C.I. Pigment Yellow 129, C.I. Pigment Yellow 138, C.I. Pigment Yellow 150, C.I. Pigment Yellow 151, C.I. Pigment Yellow 154, C.I. Pigment Yellow 155, C.I. Pigment Yellow 174, and C.I. Pigment Yellow 180.

The pigment for use in magenta ink is not particularly limited and can be suitably selected to a particular application. Specific examples thereof include, but are not limited to, C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red 57:1, C.I. Pigment Red 112, C.I. Pigment Red 122, C.I. Pigment Red 123, C.I. Pigment Red 146, C.I. Pigment Red 168, C.I. Pigment Red 176, C.I. Pigment Red 184, C.I. Pigment Red 185, C.I. Pigment Red 202, and C.I. Pigment Violet 19.

There is no specific limit to the pigment for use in cyan ink. Specific examples thereof include, but are not limited to, C.I. Pigment Blue 1, C.I. Pigment Blue 2, C.I. Pigment Blue 3, C.I. Pigment Blue 15, C.I. Pigment Blue 15:3, C.I. Pigment Blue 15:4, C.I. Pigment Blue 15:34, C.I. Pigment Blue 16, C.I. Pigment Blue 22, C.I. Pigment Blue 60, C.I. Pigment Blue 63, C.I. Pigment Blue 66, C.I. Pat Blue 4, and C.I. Pat Blue 60.

The pigment for use in the present disclosure can be newly manufactured for the present disclosure.

By using C.I. Pigment Yellow 74 as yellow pigment, C.I. Pigment Red 122 and C.I. Pigment Violet 19 as magenta pigment, and C.I. Pigment Blue 15:3 as cyan pigment, a well-balanced ink having excellent color tone and light resistance is obtained.

Chemical Modification on Surface of Pigment

It is possible to improve dispersion property of a pigment by chemically modifying the surface of a pigment.

To conduct this chemical modification on the surface of a pigment, a particular functional group (functional group such as sulfone group or carboxyl group) on the surface of the pigment is caused to be chemically bonded or the surface is wet-oxidized using at least one of hypohalous acid and a salt thereof. Since the ink that contains this kind of form has an excellent re-dispersibility after drying, clogging does not occur even when the ink moisture around the inkjet head nozzles evaporates while the printing device is suspended for a long time. Therefore, quality images can be produced again by a simple cleaning operation.

An example of the functional groups chemically modifying the surface of a pigment is an anionic group. Specific example thereof include, but are not limited to, —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, —NH—C$_6$H$_4$—SO$_3$NM$_2$, —NH—C$_6$H$_4$O—PO$_3$M$_2$, and —SO$_2$—NH—CH(PO$_3$M$_2$)$_2$, where M represents a hydrogen atom, an alkali metal, ammonium, or an organic ammonium.

Of these, —COOM (carboxylic acid), —NH—C$_6$H$_4$—COOM, —NH—C$_6$H$_4$—PO$_3$HM, —NH—C$_6$H$_4$—PO$_3$M$_2$, —NH—C$_6$H$_4$O—PO$_3$M$_2$ (phosphoric acid), and —SO$_2$—NH—CH(PO$_3$M$_2$)$_2$ (bisphosphonic acid) are preferable. It is particularly preferable to use a phosphoric acid group or a bisphosphonic acid group such as —NH—C$_6$H$_4$O—PO$_3$M$_2$ and —SO$_2$—NH—CH(PO$_3$M$_2$)$_2$, which are bonded on the surface of a pigment.

It is preferable that the surface of the pigment is chemically modified by a neutralized phosphoric acid group or a neutralized bisphosphonic acid group.

M in the functional group is, for example, as follows but lithium, sodium, and quaternary ammonium are preferable.

Specific examples of M in the functional group include, but are not limited to, alkali metals such as lithium, sodium, and potassium.

Specific examples of the organic ammonium include, but are not limited to, mono, di, or tri-methyl ammonium, mono, di, or tri-ethyl ammonium, and mono, di, or tri-methanol ammonium.

For example, quaternary ammonium is preferable as M in the functional group. The following quaternary ammonium groups are more preferable.

Specific examples of the quaternary ammonium ions include, but are not limited to, tetramethyl ammonium ion, tetraethyl ammonium ion, tetrapropyl ammonium ion, tetrabutyl ammonium ion, tetra pentyl ammonium ion, benzyl trimethyl ammonium ion, benzyl triethyl ammonium ion, and tetrahexyl ammonium ion.

Of these, tetraethyl ammonium ion, tetrabutyl ammonium ion, and benzyl trimethyl ammonium ion are preferable and tetrabutyl ammonium ion is particularly preferable.

The anionic functional group can be bonded on the surface of a pigment particle by known methods described as in JP-4697757-B (JP-2000-512670-A), JP-2003-513137-A, W097/48769, JP-H10-110129-A, JP-H11-246807-A, JP-H11-57458-A, JP-H11-189739-A, JP-H11-323232, JP-2000-265094-A, etc.

To obtain the anionic-charged color pigment, —COONa is introduced onto the surface of the color pigment. For example, there are oxidizing methods using sodium hypochlorite, methods by sulfonating, and methods of using reaction of a diazonium salt.

Copolymer

The ink of the present disclosure may include a copolymer and the copolymer can be used as a pigment dispersant.

As the copolymer, acrylic acid-based copolymers, vinyl-based copolymers, polyester-based copolymers, and polyurethane-based copolymers can be used. The acrylic acid-based copolymer represents copolymers using an acrylic acid derivative monomer and/or a methacrylic acid derivative monomer.

As the copolymer, a copolymer having a structure unit represented by Chemical formula I and a structure unit represented by Chemical formula II and a copolymer having a neutralized phosphoric acid group or a neutralized bisphosphonic acid group are preferable.

As the copolymer having a neutralized phosphoric acid group or a neutralized bisphosphonic acid group, a copolymer prepared by neutralizing a copolymer obtained by using an acrylic acid derivative monomer or a methacrylic acid derivative monomer having a phosphoric acid group or a bisphosphonic acid group is preferable. In the copolymer having a neutralized phosphoric acid group or a neutralized bisphosphonic acid group, the content thereof to the copolymer having a structure unit of a monomer having a phosphoric acid group or a bisphosphonic acid is preferably from 5 percent by mass to 80 percent by mass and more preferably from 10 percent by mass to 60 percent by mass. The storage stability of an ink can be secured by this ratio.

The pigment is preferably dispersed in the ink by a copolymer having a neutralized phosphoric acid group or a neutralized bisphosphonic acid group or a copolymer having a structure unit represented by the following Chemical formula I and a structure unit represented by Chemical formula II.

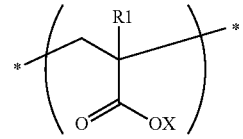

Chemical formula I

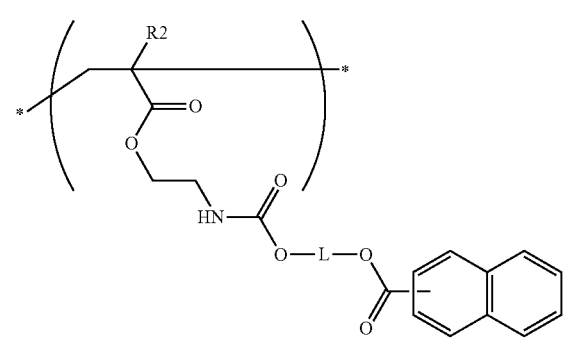

Chemical formula II

In the Chemical formula I, R1 and R2 each, independently represent hydrogen atoms or methyl groups, X represents a hydrogen atom or a cation, and L represents alkylene groups having 2 to 18 carbon atoms.

Specific examples of the cations of X include, but are not limited to, alkali metal ions, ammonium ion, and organic ammonium ions.

Furthermore, the copolymer may optionally have a repeating unit formed of other polymerizable monomers in addition to the structure unit represented by Chemical formula I, the structure unit represented by Chemical formula II, and the structure unit having a phosphoric acid group or a bisphosphonic acid group. Such other polymerizable monomers are not particularly limited and can be selected to a particular application. Examples thereof are polymerizable hydrophobic monomers, polymerizable hydrophilic monomers, and polymerizable surfactants.

The hydrophobic monomers are not particularly limited. Specific examples thereof include, but are not limited to, unsaturated ethylene monomers having an aromatic ring such as benzyl (meth)acrylate, styrene, α-methyl styrene, 4-t-butyl styrene, and 4-chloromethyl styrene; (meth)acrylic acid alkyl such as methyl(meth)acrylate, ethyl(meth)acrylate, n-butyl(meth)acrylate, dimethyl maleate, dimethyl itaconate, dimethyl fumarate, lauryl(meth)acrylate, tridecyl (meth)acrylate, tetradecyl(meth)acrylate, pentadecyl(meth)acrylate, hexadecyl(meth)acrylate, heptadecyl(meth)acrylate, octadecyl(meth)acrylate, nonadecyl(meth)acrylate, eicosyl(meth)acrylate, heneicosyl(meth)acrylate, and docosyl(meth)acrylate; and unsaturated ethylene monomers having an alkyl group such as 1-heptene, 3,3-dimethyl-1-pentene, 4,4-dimethyl-1-pentene, 3-methyl-1-hexene, 4-methyl-1-hexene, 5-methyl-1-hexene, 1-octene, 3,3-dimethyl-1-hexene, 3,4-dimethyl-1-hexene, 4,4-dimethyl-1-hexene, 1-nonene, 3,5,5-trimethyl-1-hexene, 1-decene, 1-undecene, 1-dodecene, 1-tridecene, 1-tetradecene, 1-pentadecene, 1-hexadecene, 1-heptadecene, 1-octadecene, 1-nonadecene, 1-eicocene, and 1-dococene. These can be used alone or in combination.

The hydrophilic monomers are not particularly limited. Specific examples thereof include, but are not limited to, anionic unsaturated ethylene monomers such as (meth) acrylic acid or salts thereof, maleic acid and salts thereof, monomethyl maleate, itaconic acid, monomethyl itaconate, fumaric acid, 4-styrene sulfonic acid, and 2-acrylamide-2-methyl propane sulfonic acid, 2-methacryloyloxyethyl acid phosphoate, 1-methacryloyloxy ethane-1,1-diphosphonic acid; and nonionic unsaturated ethylene monomers such as 2-hydroxyethyl(meth)acrylic acid, diethylene glycol mono (meth)acrylate, triethylene glycol(meth)acrylate, tetraethylene glycol(meth)acrylate, polyethylene glycol mono(meth)acrylate, (meth)acrylamide, N-methylol(meth)acrylamide, N-vinyl formamide, N-vinylacetoamide, N-vinylpyrolidone, acrylamide, N,N-dimethyl acrylamide, N-t-butyl acrylamide, N-octyl acrylamide, N-t-octyl acrylamide, and diacetone(meth)acrylamide. These can be used alone or in combination.

The polymerizable surfactant is, for example, an anionic or nonionic surfactant having at least one radically-polymerizable unsaturated double bond group in its molecule. Specific examples of the anionic surfactant include, but are not limited to, a hydrocarbon compound having a sulfate salt group such as ammonium sulfate group ($-SO_3^{-NH_4^+}$) and an allyl group ($-CH_2-CH=CH_2$), a hydrocarbon compound having a sulfate group such as ammonium sulfate group ($-SO_3^-NH_4^+$) and a methacylic group [($-CO-C(CH_3)=CH_2$], and an aromatic hydrocarbon compound having a sulfate group such as ammonium sulfate group ($-SO_3^- NH_4^+$) and a 1-propenyl group ($-CH=CH_2CH_3$). Specific examples thereof include, but are not limited to, ELEMINOL JS-20 and RS-300 (both manufactured by Sanyo Chemical Industries, Ltd.) and Aqualon KH-10, Aqualon KH-1025, Aqualon KH-05, Aqualon HS-10, Aqualon HS-1025, Aqualon BC-0515, Aqualon BC-10, Aqualon BC-1025, Aqualon BC-20, and Aqualon BC-2020 (all manufactured by DKS Co. Ltd.).

The nonionic surfactant is, for example, a hydrocarbon compound or an aromatic hydrocarbon compound having 1-propenyl group ($-CH=CH_2CH_3$) and a polyoxyethylene group [$-(C_2H_4)_n-H$]. Specific examples thereof include, but are not limited to, Aqualon RN-20, Aqualon RN-2025, Aqualon RN-30, and Aqualon RN-50 (all manufactured by DKS Co. Ltd.) and LATEMUL PD-104, LATEMUL PD-420, LATEMUL PD-430, and LATEMUL PD-450 (all manufactured by Kao Corporation).

One or more kinds of the polymerizable surfactants are mixed and is suitably 0.1 percent by mass to 10 percent by mass to the monomer constituting the copolymer having a structure unit represented by Chemical formula I and a structure unit represented by Chemical formula II, or the monomer constituting the copolymer having a phosphoric acid group or a bisphosphonic acid group.

The copolymer is obtained by reacting a monomer component with a solvent placed in a flask equipped with a stirrer, a thermometer, and a nitrogen gas introducing tube under the presence of a polymerization initiator in nitrogen gas reflux at about 50 degrees C. to about 150 degrees C. The viscosity of the aqueous solution or a water liquid dispersion of the synthesized copolymer is adjusted by changing the molecular weight thereof. Specifically, it can be changed by changing the monomer concentration, the amount of a polymerization initiator, polymerization temperatures, and polymerization time during polymerization.

With regard to the polymerization temperature, a polymer having a low molecular weight is easily obtained by polymerization at high temperatures for a short period of time. By contrast, a copolymer having a high molecular weight tends to be obtained by polymerization at low temperatures for a long period of time. With regard to the amount of a polymerization initiator, if a large amount thereof is used, a polymer having a low molecular weight tends to be obtained. If the amount is small, a polymer having a high molecular weight tends to be obtained. With regard to the monomer concentration during polymerization reaction, if the concentration is high, a polymer having a low molecular weight tends to be obtained. If the concentration is low, a polymer having a high molecular weight tends to be obtained. The weight average molecular weight of the copolymer is not particularly limited and can be appropriately selected to a particular application. It is preferably from 3,000 to 60,000, more preferably from 4,000 to 50,000, and furthermore preferably from 5,000 to 30,000. When the weight average molecular weight is within the preferable range and the copolymer is used for an ink for inkjet recording, the dispersion stability and discharging stability of the ink are improved.

The weight average molecular weight can be measured by, for example, gel permeation chromatography (GPC).

The copolymer having the structure unit of the Chemical formula I and the structure unit of the Chemical formula II is prepared as, for example, in the following chemical reaction formulae 1, 2, and 3: first, naphthalene carboxylic acid hydroxy alkyl ester (A-2) is obtained by condensation reaction between naphthalene carbonyl chloride (A-1) and an excessive amount of diol compound under the presence of acid acceptor such as amine and pyridine. Thereafter, 2-methacryloyloxy ethylisoyanate (A-3) and (A-2) are caused to react to obtain a monomer (A-4). Thereafter, under the presence of a radical polymerization initiator, the monomer (A-4) was copolymerized with (meth)acrylic monomer (A-5) to obtain the copolymer (A-6). The weight average molecular weight of the monomer (A-4) is from 357 to 596 because L in the Chemical formula II is an alkylene group having 2 to 18 carbon atoms and R2 is a hydrogen atom or a methyl group.

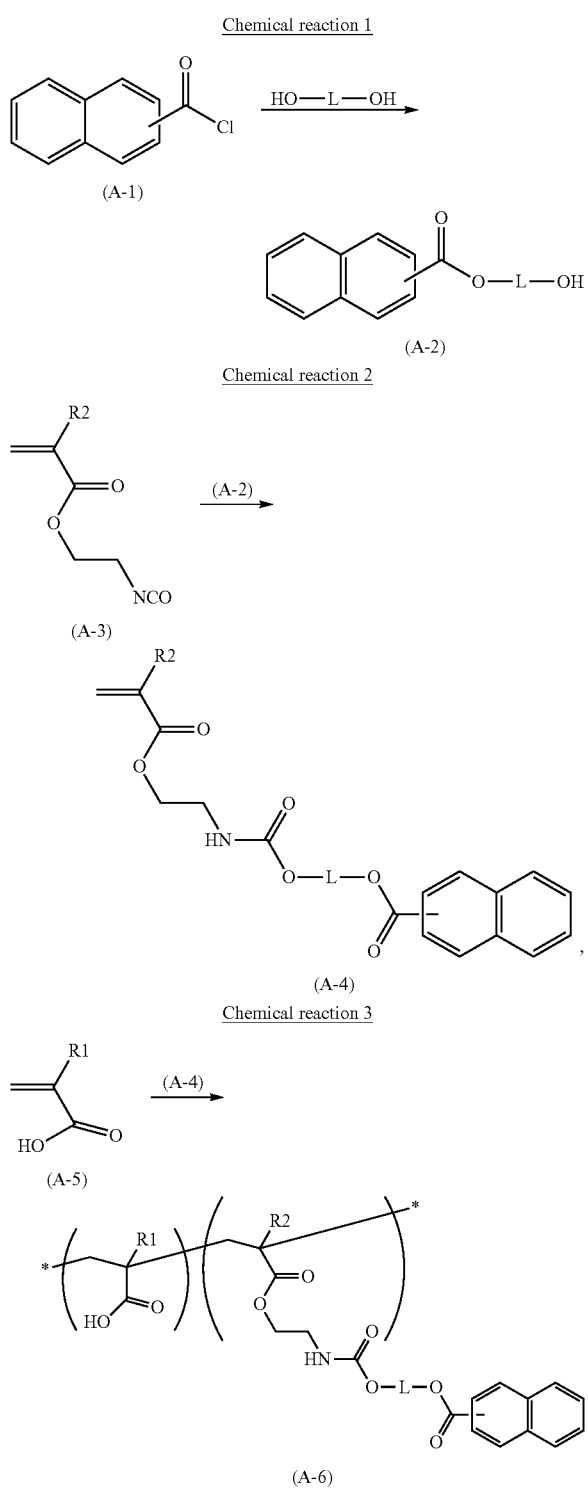

The radical polymerization initiator is not particularly limited and can be selected to a particular application. Specific examples thereof include, but are not limited to, peroxy ketal, hydroperoxide, dialkylperoxide, diacylperoxide, peroxydicarbonate, peroxyester, cyano-based azobisisobutylonitrile, azobis(2-methylbutylonitrike), azobis(2, 2'-isovaleronitrile), and non-cyano-based dimethyl-2,2'-azobis isobutylate. Of these, organic peroxides and azo-based compounds are preferable and azo compounds are particularly preferable in terms of easiness of molecular weight control and low dissolution temperature.

In addition, the content of the radical polymerization initiator is not particularly limited and can be determined to a particular application. The content thereof is preferably from 1 percent by mass to 10 percent by mass based on the total amount of the polymerizable monomer.

To control the molecular weight of the polymer, a chain transfer agent is optionally added.

Specific examples of the chain transfer agents include, but are not limited to, mercapto acetate, mercapto propionate, 2-propane thiol, 2-meracapto ethanol, thiophenol, dodecyl mercaptane, 1-dodecane thiol, and thioglycerol.

The polymerization temperature is not particularly limited. The polymerization temperature can be suitably selected to a particular application. The polymerization temperature is preferably from 50 degrees C. to 150 degrees C. and more preferably from 60 degrees C. to 100 degrees C. The polymerization time is not particularly limited. The polymerization time can be suitably selected to a particular application. It is preferably from 3 hours to 48 hours.

The molar ratio of the repeating unit represented by Chemical formula I and the repeating unit represented by Chemical formula II constituting the copolymer relating to the present disclosure is from 0.1:1.0 to 10.0: 1.0, preferably from 0.3:1.0 to 5.0:1.0, and more preferably from 0.5:1.0 to 3.0:1.0 in terms of the power to adsorb a pigment. If the ratio of the structure unit represented by the Chemical formula I and the structure unit represented by Chemical formula II is shown in mass, it is from 37 percent by mass to 98 percent by mass, preferably from 54 percent by mass to 95 percent by mass, and more preferably from 66 percent by mass to 92 percent by mass.

To disperse a pigment using the copolymer mentioned above, it is possible to use, for example, a mixing and kneading and dispersing machine using balls such as a bead mill or a ball mill, a mixing and kneading and dispersing machine using a shearing force such as a roll mill, or an ultrasonic wave dispersion machine.

By neutralizing the ionic group of the copolymer by using alkali metal, ammonium, or organic amine, the affinity thereof to water is increased, thereby imparting water dispersion property to the copolymer.

Specific examples of the alkali metal include, but are not limited to, lithium, sodium, and potassium.

Specific examples of the organic amines include, but are not limited to, alkyl amines such as mono-, di-, or tri-methylamine, mono-, di-, or tri-ethylamine, tetramethylammonium hydroxide, tetraethylammonium hydroxide; alcohol amines such as ethanol amine, diethanol amine, triethanol amine, methyl ethanol amine, methyl diethanol amine, dimethyl ethanol amine, monopropanol amine, dipropanol amine, tripropanol amine, isopropanol amine, trishydroxy methylaminomethane, and 2-amino-2-ethyl-1,3-propane diol (AEPD); and cyclic amines such as choline, morpholine, N-methylmorpholine, N-methyl-2-pyrolidone, and 2-pyrolidone.

Of these, potassium ion and tetraethyl ammonium hydroxide are preferable in terms of in particular image density and storage stability.

Polymer Coverage Pigment Particle

A method of dispersing a pigment in an aqueous system by obtaining a polymer coverage pigment particle by coating the surface of a pigment with a myriad of polymer particulate is known.

Specific examples of the polymers forming the polymer coverage pigment particle include, but are not limited to, vinyl-based polymers, polyester-based polymers, and polyurethane-based polymers. In particular, the polymers specified in JP-2000-53897-A and JP-2001-139849-A can be suitably used. Of these, vinyl-based polymers and polyester-based polymers are preferable in particular.

Polyester-based Polymer

Polyester-based polymers are made by a polycarboxylic acid and a polyalcohol.

Specific examples of the polycarboxylic acids include, but are not limited to, aromatic dicarboxylic acids such as terephthalic acid, isophthalic acid, orthophthalic acid, 1,5-naphthalene diacarboxylic acid, 2,6-naphthalene dicarboxylic acid, diphenic acid, sulfoterephthalic acid, 5-sulfoisophthalic acid, hexahydro phthalic anhydride, 4-sulfophthalic acid, 4-sulfo naphthalene-2,7-dicarboxylic acid, 5,[4-sulfophenoxy]isophthalic acid, and sulfoterephthalic acid; aliphatic dicarboxylic acids such as succinic acid, adipic acid, azelaic acid, sebacic acid, and dodecane dicarboxylic acid; aromatic oxy carboxylic acids, alicyclic dicarboxylic acids, and tri- or higher carboxylic acids.

Specific examples of the polyols include, but are not limited to, aliphatic polyols such as ethylene glycol, propylene glycol, 1,3-propane diol, 2,3-butane diol, 1,4-butane diol, 1,5-pentane diol, 1,6-hexane diol, neopentyl glycol, diethylene glycol, dipropylene glycol, 2,2,4-trimethyl-1,3-pantane diol, polyethylene glycol, polypropylene glycol, polytetramethylene glycol, trimethylol ethane, trimethylol propane, glycerin, pentaerythritol, 1,4-cyclohexane diol, 1,4-cyclohexane dimethanol, spiroglycol, tricyclo decane diol, tricyclodecane dimetanol, methaxylene glycol, orthoxylene glycol, 1,4-phenylene glycol, bisphenol A, and lactone-based polyester polyols; alicyclic polyols and aromatic polyols.

Vinyl-based Polymer

The vinyl-based polymer is not particularly limited. For example, vinyl-based polymers obtained from the following polymerizable monomers can be used. As the polymerizable monomers, specific examples thereof include, but are not limited to, vinyl-based aromatic hydrocarbons such as styrene, o-methyl styrene, m-methyl styrene, p-methyl styrene, α-methyl styrene, p-ethyl styrene, 2,4-dimethyl styrene, p-tert-butyl styrene, p-chloro styrene, and divinyl benzene; (meth)acrylates such as methyl acrylate, ethyl acrylate, butyl acrylate, n-propyl acrylate, isopropyl acrylate, n-butyl acrylate, isobutyl acrylate, t-butyl acrylate, n-pentyl acrylate, isopentyl acrylate, neopentyl acrylate, 3-(methyl)butyl acrylate, 2-ethylhexyl acrylate, cyclohexyl acrylate, hexyl acrylate, octyl acrylate, nonyl acrylate, decyl acrylate, undecyl acrylate, dodecyl acrylate, phenyl acrylate, methyl methacrylate, n-propyl methacrylate, isopropyl methacrylate, n-butyl methacrylate, isobutyl methacrylate, t-butyl methacrylate, n-pentyl methacrylate, isopentyl methacrylate, neopentyl methacrylate, 3-(methyl)butyl methacrylate, 2-ethyl hexyl methacrylate, hexyl methacrylate, octyl methacrylate, nonyl methacrylate, decyl methacrylate, undecyl methacrylate, and dodecyl methacrylate; unsaturated carboxylic acids such as acrylic acid, methacrylic acid, itaconic acid, and maleic acid; (meth)acrylic acmide, N-substituted maleimide, maleic anhydride, (meth)acrylonitrile, vinyl ketone, vinyl acetate, and vinilydene chloride. Also, resins prepared by the polymerizable monomer alone or in combination can be used.

Method of Covering Pigment with Polymer

As the method of covering a pigment with a polymer, a method is employed which includes microcapsulation to cover pigment particles with hydrophilic polymers for dispersion in an aqueous medium.

Microcapsulation can be conducted by any known method. Examples thereof are chemical manufacturing methods, physically manufacturing methods, physically-chemically manufacturing methods, and mechanical methods. Specifically, the following methods are suitable and in particular the phase transfer emulsification method, the acid deposition method, and the interfacial polymerization method are used for inkjet.

Acid deposition method (a method of neutralizing at least a part of the anionic group of an organic polymer having an anionic group to impart water solubility, mixing and kneading it with a coloring material in an aqueous medium, and neutralizing or acidizing the resultant with an acidic compound to precipitate the organic compound to fixate it on the coloring material followed by neutralization for dispersion);

Phase transfer emulsification method (a method of putting water in an organic solvent phase of a mixture containing an anionic organic polymer having a dispersion ability in water and a coloring material or putting the organic solvent phase in water);

Interfacial polymerization method (a method of dissolving two kinds of monomers or reactants in a dispersion phase and a continuous phase separately followed by reaction at the interface therebetween to form a wall film);

In-situ polymerization method (a method of supplying a liquid or gas monomer and a catalyst or two kinds of reactive materials from one side of the continuous phase nuclear particle side to conduct reaction to form a wall film);

Method of coating by curing in liquid (a method of forming a wall film by causing droplets of a polymer solution containing core material particles to be un-dissolved in liquid by a curing agent, etc.);

Coacervation (phase separation) method (a method of forming a wall film by separating a polymer liquid dispersion in which core material particles are dispersed into coacervate (dense phase) having a high polymer concentration and a diluted phase);

Method of drying in liquid (a method of forming a wall film by preparing a liquid dispersion in which a core material is dispersed in a wall-film liquid material and putting the liquid dispersion in a liquid in which the continuous phase of the liquid dispersion is not mixable to obtain a complex emulsion to gradually remove the medium in which the wall-film material is dissolved);

Melting dispersion cooling method (a method of forming a wall film by heating and liquidizing a wall-forming material which is liquidized by heating and solidified at room temperature to disperse core material particles therein and make fine particles from them followed by cooling-down);

Method of suspension coating in air (a method of forming a wall film by suspending core material particles of powder by a fluid bed and mixing coating liquid of the wall-film material by spraying while floating the core material particles in air stream); and Spray drying method (a method of forming a wall film by spraying an encapsulating raw liquid to contact heated wind to vaporize and dry the volatile portion thereof).

Polymer particulates demonstrate excellent water-dispersibility all the more by introducing an ionic group into the surface thereof. Specific examples of such ionic groups include, but are not limited to, sulfonic acid group, carboxylic acid group, sulfuric acid group, phosphoric acid group, phosphonic acid group, bisphosphonic acid group, phosphonic acid group, alkali metal salt groups thereof, ammonium salt groups thereof, and primary to tertiary amine groups thereof. Carboxylic acid alkali metal salt groups, carboxylic acid ammonium salt groups, phosphoric acid alkali metal salt groups, phosphoric acid ammonium salt groups, bisphosphonic acid alkali metal salt groups, and bisphosphonic acid ammonium salt groups are preferable. In particular, phosphoric acid alkali metal salt groups, phosphoric acid ammonium salt groups, bisphosphonic acid alkali metal salt groups, and bisphosphonic acid ammonium salt groups are preferable in terms of water dispersion stability.

The ionic group is introduced by adding a monomer having an ionic group when synthesizing a resin. Specific examples of such salts include, but are not limited to, Li, Na, K, Mg, Ca, Cu, and Fe. Li, Na, and K are preferable.

Known additives such as pH regulators, preservatives and fungicides, corrosion inhibitors, anti-oxidants, ultraviolet absorbers, oxygen absorbers, light stabilizers, and anti-kogation agents can be optionally selected and added to the ink of the present disclosure.

pH Regulator pH regulators are added to stabilize dispersion state and discharging. However, when the pH is too high, for example, 11 or higher, the head of inkjet and an ink supplying unit tend to be dissolved easily, which causes modification, leakage, deterioration of discharging performance of the ink, etc. It is more desirable to add a pH regulator when a pigment is mixed and kneaded and dispersed together with a dispersant in water than when additives such as a water soluble solvent and a permeating agent are added after mixing, kneading, and dispersing. This is because such dispersion may be broken by an addition of a pH regulator depending on the kind thereof.

The pH regulator is preferable to contain at least one of an alcohol amine, an alkali metal hydroxide, ammonium hydroxide, a phosphonium hydroxide, and an alkali metal carbonate.

Specific examples of the alcohol amines include, but are not limited to, diethanol amine, triethanol amine, and 2-amino-2-ethyl-1,3-propane diol.

Specific examples of the hydroxides of alkali metal elements include, but are not limited to, lithium hydroxide, sodium hydroxide, and potassium hydroxide.

Specific examples of the hydroxides of ammonium include, but are not limited to, ammonium hydroxide and hydroxides of quaternary ammonium.

A specific example of the hydroxides of phosphonium is a hydroxide of quaternary phosphonium. Specific examples of the carbonates of alkali metal include, but are not limited to, lithium carbonate, sodium carbonate, and potassium carbonate.

Preservatives and Fungicides

Specific examples of the preservatives and fungicides include, but are not limited, dehydrosodium acetate, sodium sorbinate, 2-pyridine thiol-1-oxide sodium, sodium benzoate, and pentachlorophenol sodium.

Corrosion Inhibitor

Specific examples of the corrosion inhibitors include, but are not limited to, acid sulfite, thiosodium sulfate, ammonium thiodiglycolate, diisopropyl ammonium nitrite, pentaerythritol tetranitride, and dicyclohexyl ammonium nitrite.

Anti-oxiadant

Specific examples of the anti-oxidants include, but are not limited to, phenol-based anti-oxidants (including hindered phenol-based anti-oxidants), amino-based anti-oxidants, sulfur-based anti-oxidants, and phosphorous-based anti-oxidants.

Ultraviolet Absorber

Specific examples of the ultraviolet absorbers include, but are not limited to, benzophenone-based ultraviolet absorbers, benzotriazole-based ultraviolet absorbers, salicylate-based ultraviolet absorbers, cyanoacrylate-based ultraviolet absorbers, and nickel complex salt-based ultraviolet absorbers.

Anti-kogation Agent

Kogation is a problematic phenomenon in which ink components modified upon application of heat by a heater adhere to the heater, which occurs to a thermal head that discharges ink by a foaming force thereof by instant heating upon application of an electric current to a heater. If kogation occurs, the heater cannot conduct heating properly so that the ink discharging weakens and the ink is not discharged at the worst.

Specific examples of the anti-kogation agents include, but are not limited to, polyphosphoric acid, polyamino carboxylic acid, aldonic acid, hydroxy carboxylic acid, polyol phosphoric acid esters, and salts thereof, acids having an amino group and salts thereof, and ammonium salts of acids having a methyl group or a methylene group and a carboxylic group.

Water

As water, deionized water, ultra-filtered water, reverse osmosis water, distilled water, pure water, and ultra pure water can be used. The content of water is preferably from 20 percent by mass to 80 percent by mass to the total amount of an ink.

Recording Device

The ink of the present disclosure can be suitably applied to various recording devices employing an inkjet recording method such as printers, facsimile machines, photocopiers, multifunction peripherals (serving as a printer, a facsimile machine, and a photocopier) for inkjet recording.

The inkjet recording device of the present disclosure preferably includes a container (e.g., ink container) to contain the ink of the present disclosure and a recording head to discharge the ink supplied from the ink container.

The inkjet recording devices according to embodiments of the present disclosure, which were used in Examples, are described below.

An inkjet recording device 101 illustrated in FIG. 1 has a sheet feeder tray 102 to feed recording media placed in the inkjet recording device 101, an ejection tray 103 mounted onto the inkjet recording device 101, which stores the recording media on which images are recorded (formed), and an ink container installation unit 104. On the upper surface of the ink container installation unit 104 is arranged an operating unit 105 including operation keys, a display, etc. The ink container installation unit 104 has a front cover 115 that is openable and closeable to detach and attach an ink container 200. The reference numeral 111 represents an upper cover and, 112, the front surface of the front cover.

Figure 2:
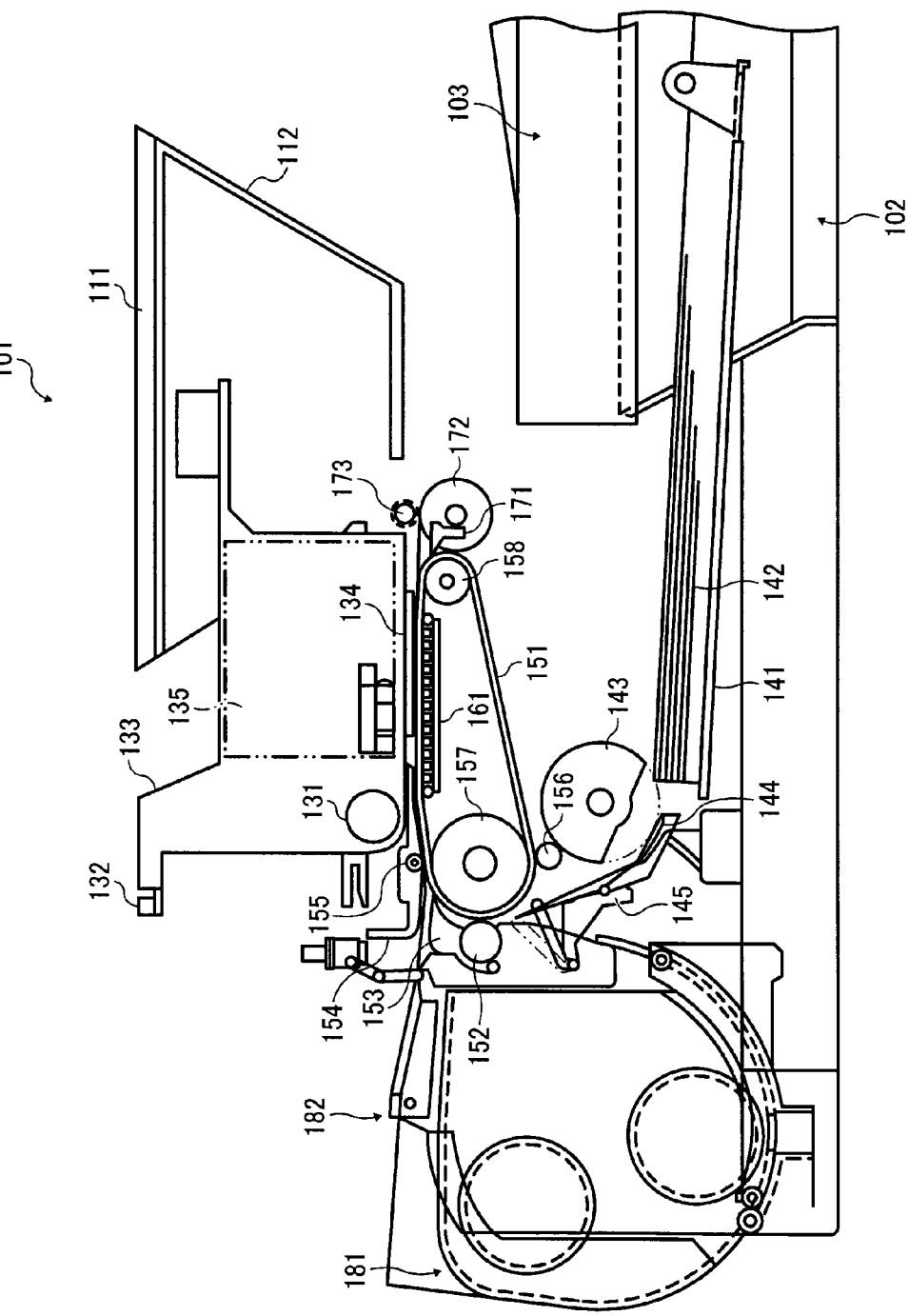
FIG. 2 is a schematic diagram illustrating the entire configuration of the inkjet recording device according to an embodiment of the present invention.

Inside the inkjet recording device 101, as illustrated in FIG. 2, a guide rod 131 and a stay 132 serving as guiding members that are laterally bridged from the right side to the left side hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to discharge an ink such as a piezoelectric actuator such as a piezoelectric element, a thermal actuator that utilizes the phase change caused by film boiling of liquid using an electric heat conversion element such as a heat element, a shape-memory alloy actuator that uses the metal phase change due to the temperature change, and an electrostatic actuator that uses an electrostatic force.

The carriage 133 has sub tanks 135 for colors to supply each color ink to the recording head 134. The ink is supplied and replenished to the sub-tank 135 from the ink container 200 of the present disclosure mounted onto the ink container installation unit 104 via an ink supplying tube.

A sheet feeding unit to feed a sheet 142 loaded on a sheet loader (pressure plate) 141 of the sheet feeder tray 102 includes a half-moon shape roller (sheet feeding roller 143) to separate and feed the sheet 142 one by one from the sheet loader 141 and a separation pad 144 that is made of a material having a large friction index and arranged facing the sheet feeding roller 143 while being biased towards the sheet feeding roller 143.

A transfer unit to transfer the sheet 142 fed from the sheet feeding unit on the lower side of the recording head 134 includes a transfer belt 151 to electrostatically adsorb and transfer the sheet 142, a counter roller 152 to transfer the sheet 142 fed from the sheet feeding unit via a guide 145 while pinching the sheet 142 with the transfer belt 151, a transfer guide 153 to make the sheet 142 track on the transfer belt 151 by changing the transfer direction of the sheet 142 being sent substantially vertically upward by substantially 90°, a front end pressure roller 155 biased towards the transfer belt 151 by a pressing member 154, and a charging roller 156 to charge the surface of the transfer belt 151.

The transfer belt 151 is an endless form belt, stretched between a transfer roller 157 and a tension roller 158 and rotatable in the belt transfer direction. This transfer belt 151 includes, for example, a top layer serving as a sheet adsorption surface made of a resin material such as a copolymer (ETFE) of tetrafluoroethylene and ethylene with no resistance control treatment having a thickness of about 40 µm, and a bottom layer (moderate resistance layer, earth layer) made of the same material as the top layer with resistance control treatment with carbon.

On the rear side of the transfer belt 151, a guiding member 161 is arranged corresponding to the printing area by the recording head 134. An ejection unit to eject the sheet 142 on which images are recorded by the recording head 134 includes a separation claw 171 to separate the sheet 142 from the transfer belt 151, a discharging roller 172, and a discharging roller 173. An ejection tray 103 is arranged below the discharging roller 172.

A duplex printing sheet feeding unit 181 is mounted in a detachable and attachable manner to the rear side of the inkjet recording device 101.

The duplex printing sheet feeding unit 181 takes in and reverses the sheet 142 that is returned by the reverse rotation of the transfer belt 151 and feeds it again between the counter roller 152 and the transfer belt 151. A bypass sheet feeding unit 182 is provided on the upper surface of the duplex printing sheet feeding unit 181.

In this inkjet recording device 101, the sheet 142 is separated and fed from the sheet feeding unit one by one substantially vertically upward, guided by the guide 145, and transferred while being pinched between the transfer belt 151 and the counter roller 152. Furthermore, the front end of the sheet 142 is guided by the transfer guide 153 and pressed against the transfer belt 151 by the front end pressure roller 155 to change the transfer direction substantially 90°.

Since the transfer belt 157 is charged by the charging roller 156 at this point in time, the sheet 142 is electrostatically adsorbed to the transfer belt 151 and transferred. By driving the recording head 134 in accordance with the image signal while moving the carriage 133, ink droplets are discharged to the sheet 142 not in motion to record an image for an amount corresponding to one line and thereafter the sheet 142 is transferred in a predetermined amount to conduct recording for the next line. On receiving a signal indicating that the recording completes or the rear end of the sheet 142 has reached the image recording area, the recording operation stops and the sheet 142 is ejected to the ejection tray 103.

When the amount of ink remaining in the sub-tank 135 is detected to be approaching to empty, a predetermined amount of the ink is replenished to the sub tank 135 from the ink container 200.

In this inkjet recording device 101, it is possible to dissemble the chassis of the ink container 200 and replace the ink containing unit therein when the ink is used up in the ink container 200.

In addition, the ink container 200 stably supplies the ink even when the ink container 200 is placed on its side and installed by front loading. Therefore, even when the upside of the inkjet recording device 101 is blocked, for example, it is placed in a rack or something is placed on the upper surface of the inkjet recording device 101, the ink cartridge 200 is easily exchanged.

A serial type (shuttle type) in which the carriage scans is used in this description but this is true in a line-type inkjet recording device having a line type head.

Ink Container

The ink of the present disclosure can be accommodated in a container having an ink containing unit to contain an ink. Any other suitably-selected member can be used in combination.

The container does not particularly limited. Any form, any structure, any size, and any material can be suitably selected to a particular application. For example, a container having an ink containing unit formed of aluminum laminate film, a resin film, etc. can be suitably used.

Figure 3:
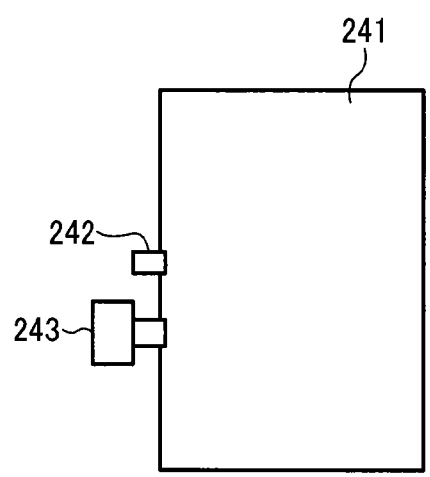
FIG. 3 is a schematic diagram illustrating an example of the ink containing unit of the ink container according to an embodiment of the present invention.
Figure 4:
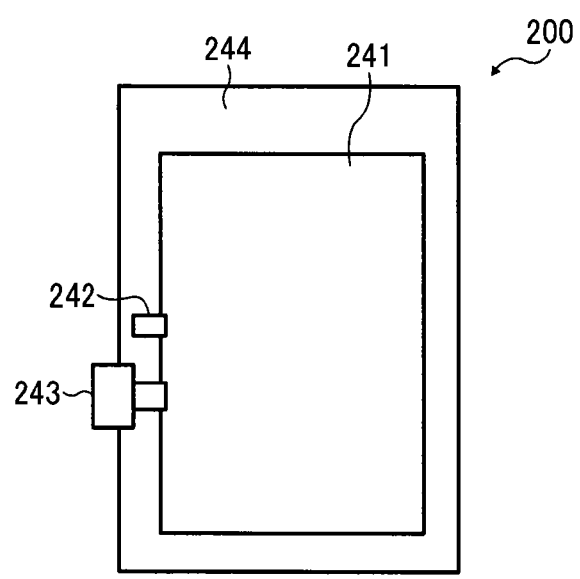
FIG. 4 is a schematic diagram illustrating an example of the ink container that contains the ink containing unit illustrated in FIG. 3 in the housing.

Next, an example of the ink container is described in detail with reference to FIGS. 3 and 4. FIG. 3 is a schematic diagram illustrating an example of an ink containing unit 241 of the ink container of the present disclosure. FIG. 4 is a schematic diagram illustrating an ink container 200 that includes the ink containing unit 241 of FIG. 3 in a housing 244 of the ink container 200.

As illustrated in FIG. 3, after the ink containing unit 241 is filled with the ink through an ink inlet 242 and the air remaining in the ink containing unit 241 is discharged, the ink inlet 242 is closed by fusion.

When in use, an ink outlet 243 made of rubber is pierced by the needle installed onto an inkjet recording device to supply the ink into the device. The ink containing unit 241 is formed of a packaging material such as aluminum laminate film having no air permeability. The ink containing unit 241 is accommodated in general in a cartridge housing 244 made of plastic as illustrated in FIG. 4 and detachably attachable to various inkjet recording devices as the ink containing unit 200. It is particularly preferable that the ink container of the present disclosure is detachably attachable to the inkjet recording device of the present disclosure.

Recorded Matter

In the recorded matter of the present disclosure, an information or an image is formed on a recording medium using the ink of the present disclosure. This can be manufactured by a process of discharging an ink from an inkjet head to conduct recording on a recording medium.

The recorded matter of the present disclosure is of high quality and blur-free image and excellent in stability over time so that it can be suitably used for various purposes as references, on which texts, images, etc. are recorded.

The recording medium has no particular limit and can be selected to a particular application. For examples, plain paper, coated paper for printing, gloss paper, special paper, cloth, film, and transparent sheets can be used. These can be used alone or in combination. Of these, plain paper and coated paper for printing are preferable. Plain paper is advantageous because it is inexpensive. Moreover, coated paper for printing is relatively inexpensive to gloss paper and advantageous in that smooth images with gloss are printed.

However, plain paper and coated paper for printing are not dried well. For this reason, in general, they are not practically suitable for inkjet printing. However, according to the ink of the present disclosure, drying property is improved so that such recording media can be suitably used.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto.

The method of measuring the weight average molecular weight used in Examples and Comparative Examples and the evaluation methods of an ink are described first.

Measuring of Weight Average Molecular Weight

The weight average molecular weight was measured as follows.

The weight average molecular weight was measured according to gel permeation chromatography (GPC) method using a column constant temperature tank (CTO-20A, manufactured by Shimadzu Corporation), a detector (RID-10A, manufactured by SHIMADZU CORPORATION), an eluent flowing path pump (LC-20AD, manufactured by SHIMADZU Corporation), a deflating equipment (Degasser DGU-20A, manufactured by SHIMADZU CORPORATION), and an autosampler (SIL-20A, manufactured by SHIMADZU CORPORATION). The column used was formed by connecting an aqueous SEC column TSKgel G3000 PWXL (elimination limit molecule quantity: $2\times10^5$), TSKgel G5000 PWXL (elimination limit molecule quantity: $2.5\times10^6$), and TSKgel G6000 PWXL (elimination limit molecule quantity: $5\times10^7$) (all manufactured by TOSOH CORPORATION). A sample adjusted to be 2 g/100 ml with an eluent was used. As the eluent, an aqueous solution was used in which both the content of acetic acid and sodium acetate were adjusted to be 0.5 mol/L for each. The column temperature was set to be 40 degrees C. and the flow speed was set to be 1.0 ml/min. The calibration curve was made by using nine standard samples of polyethylene glycol having a molecular weight of 1,065, 5,050, 24,000, 50,000, 107,000, 140,000, 250,000, 540,000, and 920,000.

Evaluation Method

The Ink prepared in Examples and Comparative Examples were measured and evaluated as follows:

1. Storage Stability of Ink

An ink container was filled with each ink and stored at 70 degrees C. for 14 days. The change rate of the viscosity after the storage to the viscosity before the storage was obtained from the following relation 1 and evaluated according to the following criteria.

Change rate of viscosity (%)=(Viscosity of ink after storage−Viscosity of ink before storage)/(Viscosity of ink before storage)×100  Relation 1

The viscosity was measured by a viscometer (RE80L, manufactured by TOKI SANGYO CO., LTD.) to measure the viscosity of the ink at 25 degrees C. at 50 rotations or 100 rotations.

Evaluation Criteria

A: Change rate of viscosity within + or −5%

B: Change rate of viscosity within the range of from −10% to less than −5% and more than 5% to 10%

C: Change rate of viscosity within −30% to less than −10% and greater than 10% to 30%

D: Change rate of viscosity less than 30% or greater than 30% (gelated to the degree that evaluation was not possible)

2. Evaluation of Discharging Stability

Images were continuously printed for 10 minutes using the printer (IPSiO GX-e 5500, manufactured by Ricoh Company Ltd.) having the configuration illustrated in FIG. 1 and FIG. 2, which is filled with each ink. After leaving the printer at 50 degrees C. and 60 percent RH for one month with a moisture retention cap on the head surface while the ink was attached thereto, the printer was subject to cleaning to make it back to the same state as before the leaving. Thereafter, an intermittent printing test was conducted under the following conditions and the discharging stability was evaluated.

That is, the following print pattern chart was printed on 20 sheets continuously and printing was halt for 20 minutes. This cycle was repeated 50 times to print the chart on 1,000 sheets in total and thereafter the printing pattern chart was printed on one more sheet, which was visually confirmed to evaluate the image with regard to streaks, dot missing, disturbance of spraying of 5 percent chart solid portion according to the following criteria.

The print pattern had a print area of 5 percent for each color in the entire area of the sheet and was printed with each ink under 100% duty. The print conditions were that the print density was 600 dpi×300 dpi with one pass printing.

The evaluation criteria are as follows: Grades A and B are allowable.

Evaluation Criteria

A: no streaks, no dot missing, or no spraying disturbance observed in the solid portion B: slight streaks, dot missing, and jetting disturbance observed in the solid portion C: streaks, dot missing, and jetting disturbance observed in the solid portion D: streaks, dot missing, and jetting disturbance observed all over the solid portion 3. Measuring Image Density (Black Ink)

A solid image was printed with one pass at a recording density of 600 dpi×300 dpi using the printer used in the evaluation for discharging stability. Subsequent to drying, the image density for black was measured using X-Rite 938 (manufactured by X-Rite Inc.). The image was evaluated according to the following evaluation criteria. The grades A and B are allowable.

Evaluation Sheet
Plain paper 1: MyPaper (A4, manufactured by Ricoh Company Ltd.)
Plain paper 2: Data Copy (manufactured by Metsa Board Corporation)
Evaluation Criteria
A: 1.25 or higher
B: 1.20 to less than 1.25
C: 1.15 to less than 1.20
D: Less than 1.15

4. Measuring of Saturation (Color Ink)

A solid image was printed with one pass at a recording density of 600 dpi×300 dpi using the printer used in the evaluation for discharging stability. Subsequent to drying, the L*a*b* value was measured for only magenta, cyan, and yellow ink using a reflection type color spectrophotometric densitometer (manufactured by X-Rite Inc.). The ratio of the measured saturation value to the saturation value (Yellow: 91.34, Magenta: 74.55, Cyan: 62.82) of the standard color (Japan color ver. 2) was calculated and evaluated according to the following criteria. The grades A and B are allowable.

Evaluation Sheet
Plain paper 1: MyPaper (A4, manufactured by Ricoh Company Ltd.)
Plain paper 2: Data Copy (manufactured by Metsa Board Corporation)
Evaluation Criteria
A: 0.90 or higher
B: 0.85 to less than 0.90
C: 0.80 to less than 0.85
D: Less than 0.80

5. Evaluation of Abrasion Resistance

A sample image was obtained on the same evaluation sheet in the same manner as in the image density measuring and the saturation measuring and the printed portion was abraded by white cotton cloth under a load of 900 g 5 times using clock meter CM-1 (manufactured by TOYO SEIKI KOGYO CO. LTD.). The sample image was evaluated according to the following criteria. The grades A and B are allowable.

Evaluation Sheet
Plain paper 1: MyPaper (A4, manufactured by Ricoh Company Ltd.)
Plain paper 2: Data Copy (manufactured by Metsa Board Corporation)
Evaluation Criteria
A: No image peeled off or no contamination around the image by visual confirmation
B: Little image peeled off or slight contamination around the image by visual confirmation
C: Slight image peeled off and contamination around the image by visual confirmation
D: Image peeled off and significant contamination around the image by visual confirmation Preparation of Raw Material Preparation methods of ink components for use in Example and Comparative Examples are described below.

Synthesis of Copolymer

Synthesis of Copolymer a

After sufficient replacement with nitrogen gas in a flask equipped with a mechanical stirrer, a thermometer, a nitrogen gas introducing tube, a reflux tube, and a dripping funnel, the following material was placed therein and heated to 65 degrees C.

Styrene: 11.2 parts
Acrylic acid: 2.8 parts
Lauryl methacrylate: 12.0 parts
Polyethylene glycol methacrylate: 4.0 parts
Styrene macromer (AS-6, manufactured by TOAGOSEI CO., LTD.): 4.0 parts
Mercapto ethanol: 0.4 parts Thereafter, the liquid mixture of the following material was dripped into the heated flask in 2.5 hours.

Styrene: 100.8 parts
Acrylic acid: 25.2 parts
Lauryl methacrylate: 108.0 parts
Polyethylene glycol methacrylate: 36.0 parts
Hydroxy ethyl methacrylate: 60.0 parts
Styrene macromer (AS-6, manufactured by TOAGOSEI CO., LTD.): 36.0 parts
Mercapto ethanol: 3.6 parts
Azobisdimethyl valeronitrile: 2.4 parts
Methylethyl ketone: 18.0 parts Subsequent to dripping, a liquid mixture of 0.8 parts of azobis dimethyl valeronitrile and 18 parts of methylethyl ketone was dripped to the flask in half an hour. Subsequent to one-hour aging at 65 degrees C., 0.8 parts of azobisdimethyl valeronitrile was added followed by further one-hour aging. Subsequent to completion of the reaction, 364 parts of methylethyl ketone was added to the flask to obtain 800 parts of a solution of copolymer a having a solid portion concentration of 50 percent.

Synthesis of Copolymer b 6.67. parts of the monomer represented by the following Chemical formula 3 and 13.33 parts of n-stearylmethacrylate, 113.0 parts of ethanol were placed in a flask followed by stirring to obtain a uniform solution. After nitrogen was blown into this solution for 30 minutes, 1.33 parts of azobisisobutylonitrile was added thereto at 65 degrees C. to conduct polymerization reaction for 8 hours. A viscous material obtained by removing the solvent from the thus-obtained liquid polymerization using an evaporator was added to acetone to retrieve a solid material. While diluting the thus-obtained copolymer b with water, potassium hydroxide was added followed by three-day dialysis membrane refinement to achieve 100 percent acid neutralization. Thereafter, the concentration of the resultant was adjusted with water in such a manner that the concentration of the solid portion was 10 percent by mass. As a result, a copolymer b was synthesized, in which the phosphoric acid group was 100 percent neutralized. The weight average molecular weight of the thus-obtained copolymer b as measured by using GPC was 8,500.

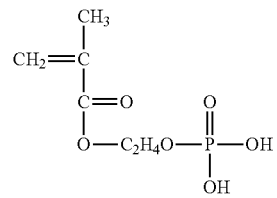

Chemical formula 3

Synthesis of Copolymer c 8.0 parts of the monomer represented by Chemical formula 4, 6.0 parts of the monomer represented by Chemical formula 5, 6.0 parts of the monomer represented by Chemical formula 6, and 113.0 parts of ethanol were placed in a flask followed by stirring to obtain a uniform solution. After nitrogen was blown into this solution for 30 minutes, 1.33 parts of azobisisobutylonitrile was added thereto at 75 degrees C. to conduct polymerization reaction for 8 hours. A viscous material obtained by removing the solvent from the thus-obtained liquid polymerization using an evaporator was added to acetone to retrieve a solid material. While diluting the thus-obtained copolymer with water, potassium hydroxide was added followed by three-day dialysis membrane refinement to achieve 100 percent acid neutralization. Thereafter, the concentration of the resultant was adjusted with water in such a manner that the concentration of the solid portion was 10 percent by mass. As a result, a copolymer c was synthesized, in which the bisphosphonic acid group was 100 percent neutralized. The weight average molecular weight of the thus-obtained copolymer c as measured by using GPC was 8,500 in which the solvent was tetrahydrofuran and the sample material was polystyrene.

of methylene chloride was dripped in two hours while being stirred followed by stirred at room temperature for six hours. The thus-obtained reaction solution was rinsed with water and thereafter the organic phase was isolated followed by drying with magnesium sulfate and the solvent was distilled away. The remainder was refined by silica gel column chromatography with a solvent mixture of a methylene chloride and methanol with a volume ratio of 98:2 serving as an eluent to obtain 52.5 parts of 2-naphthoic acid-2-hydroxyethyl ester.

Next, 42.1 parts (155 mmol) of 2-naphthoic acid-2-hydroxyethyl ester was dissolved in 80 mL of dried methylethylketone followed by heating to 60 degrees C. To this solution, a solution in which 24.0 parts (155 mmol) of 2-methacryloyloxy ethylisocyanate (Karenz MOI, manufactured by SHOWA DENKO K.K.) was dissolved in 20 mL of dried methylketone was dripped in one hour while being stirred followed by stirring at 70 degrees C. for 12 hours. After being cooled down to room temperature, the solvent was distilled away. The remainder was refined by silica gel column chromatography with a solvent mixture of a methylene chloride and methanol with a volume ratio of 99:1 serving as an eluent to obtain 57.0 parts of monomer M-1 represented by the following Chemical structure II-1.

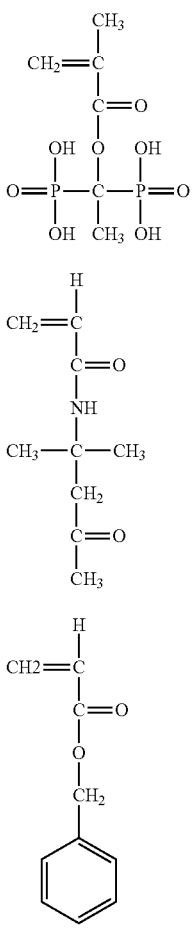

Chemical Formula 4

Chemical Formula 5

Chemical Formula 6

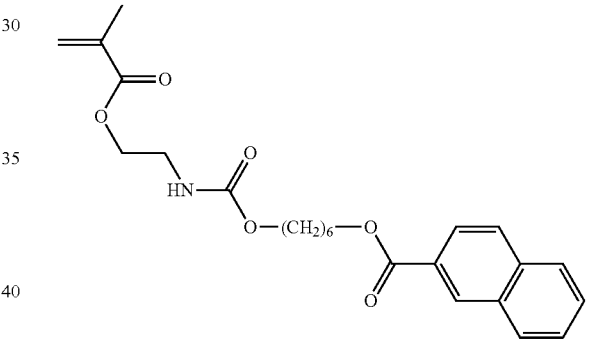

Chemical structure II-1

Synthesis of Copolymer d 62.0 parts (525 mmol) of 1,6-hexanediol (manufactured by Tokyo Chemical Industry Co., Ltd.) was dissolved in 700 mL of methylene chloride and 20.7 g (262 mmol) of pyridine was further added.

To this solution, a solution in which 50.0 parts (262 mmol) of 2-naphthalene carbonyl chloride (manufactured by Tokyo Chemical Industry Co., Ltd.) was dissolved in 100 ml 1.20 parts (16.7 mmol) of acrylic acid (manufactured by Sigma-Aldrich Corporation) and 7.12 parts (16.7 mmol) of the monomer M-1 were dissolved in 40 mL of dried methylethyl ketone to prepare a monomer solution. The monomer solution was divided into two with a mass ratio of 10 to 90. Thereafter, the 10 percent of the monomer solution was heated to 75 degrees C. in an argon atmosphere. 0.273 g (1.67 mmol) of 2,2'-azoiso(butylonitrile) (manufactured by Tokyo Chemical Industry Co., Ltd.) was dissolved in the 90 percent of the monomer solution, which was thereafter dripped to the heated monomer solution in 1.5 hours followed by stirring at 75 degrees C. for six hours. The resultant was cooled down to room temperature and the thus-obtained reaction solution was dripped to hexane to precipitate a copolymer. The precipitated copolymer was filtrated followed by drying with a reduced pressure to obtain 8.13 parts of a copolymer.

While dissolving the thus-obtained copolymer in tetraethylammonium hydroxide solution for 100 percent acid-neutralization, deionized water was added to control concentration in such a manner that the solid portion concentration was 10 percent by mass to obtain a copolymer d. The weight average molecular weight of the thus-obtained copolymer d as measured by using GPC was 9,200.

Synthesis of Copolymer e

A monomer M-2 represented by the following Chemical structure II-2 was obtained in the same manner as in the preparation of the copolymer d except that 1,6-hexanediol was replaced with ethylene glycol (manufactured by TOKYO CHEMICAL INDUSTRY CO., LTD.).

Chemical structure II-2

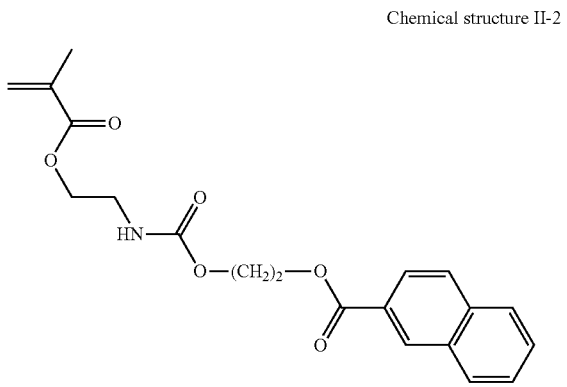

Thereafter, using acrylic acid and the obtained monomer M-2, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer e. The weight average molecular weight of the thus-obtained copolymer e as measured by using GPC was 8,700.

Synthesis of Copolymer f

A monomer M-3 represented by the following Chemical structure II-3 was obtained in the same manner as in the preparation of the copolymer d except that 1,6-hexanediol was replaced with 1,12-dodecane diol (manufactured by TOKYO CHEMICAL INDUSTRY CO., LTD.).

Chemical structure II-3

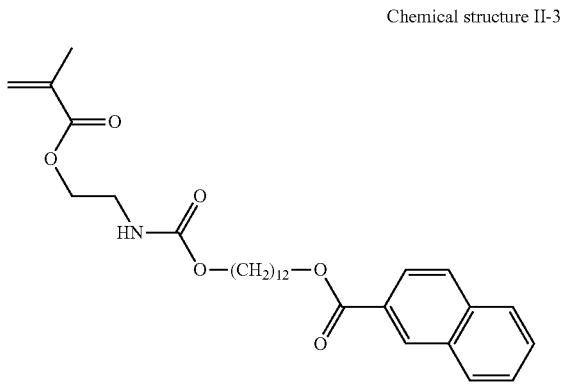

Thereafter, using acrylic acid and the obtained monomer M-3, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer f. The weight average molecular weight of the thus-obtained copolymer f as measured by using GPC was 8,700.

Synthesis of Copolymer g

A monomer M-4 represented by the following Chemical structure II-4 was obtained in the same manner as in the preparation of the copolymer d except that 1,6-hexanediol was replaced with 1,16-hexadecane diol (manufactured by TOKYO CHEMICAL INDUSTRY CO., LTD.).

Chemical structure II-4

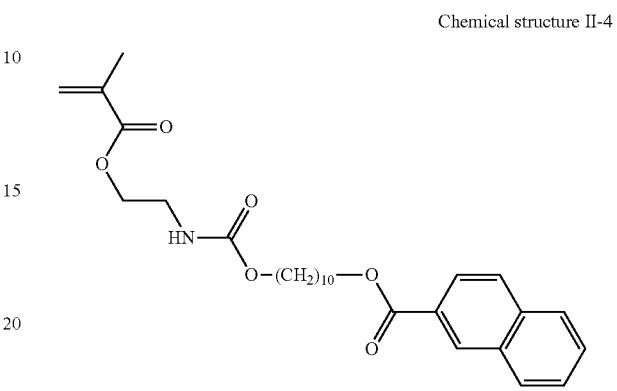

Thereafter, using acrylic acid and the obtained monomer M-4, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer g. The weight average molecular weight of the thus-obtained copolymer g as measured by using GPC was 9,400.

Synthesis of Copolymer h

Thereafter, using methacrylic acid and the monomer M-1 synthesized in the preparation of the copolymer d, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer h. The weight average molecular weight of the thus-obtained copolymer h as measured by using GPC was 9,300.

Synthesis of Copolymer i

Thereafter, changing the rate of acrylic acid and the monomer M-1 synthesized in the preparation of the copolymer d as shown in Table 2, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer i. The weight average molecular weight of the thus-obtained copolymer i as measured by using GPC was 8,700.

Synthesis of Copolymer j

Thereafter, changing the rate of acrylic acid and the monomer M-1 synthesized in the preparation of the copolymer d as shown in Table 2, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer j. The weight average molecular weight of the thus-obtained copolymer j as measured by using GPC was 8,500.

Synthesis of Copolymer k

Thereafter, changing the rate of acrylic acid and the monomer M-1 synthesized in preparation of the copolymer d as shown in Table 2, a copolymer was synthesized in the same manner as the copolymer d. While dissolving the thus-obtained copolymer in tetraethylammonium hydroxide solution for 100 percent acid-neutralization, deionized water was added to control concentration in such a manner that the solid portion concentration was 10 percent by mass to obtain a copolymer k. The weight average molecular weight of the thus-obtained copolymer k as measured by using GPC was 8,500.

Synthesis of Copolymer l 64.1 parts (150 mmol) of the monomer M-1 was dissolved in 5.16 parts (60.0 mmol) of methacrylic acid. 130 parts of deionized water, 4.00 parts of anionic radical reactive surfactant (Aqualon KH-10, manufactured by DKS Co. Ltd.), and 1.30 parts of ammonium persulfate were added to the solution to form a pre-emulsion by a HOMOMIXER. Thereafter, 2.00 parts of Aqualon KH-10 was added to 100 parts of deionized water, which was thereafter heated to 80 degrees C. in argon atmosphere. Thereafter, 10 percent of the pre-emulsion was added to conduct initial polymerization for 30 minutes. Thereafter, the rest of the pre-emulsion was dripped in two hours to conduct polymerization followed by further polymerization at 80 degrees C. for two hours. Subsequent to cooling down, the resultant was filtered and neutralized by ammonium water to obtain O/W emulsion for addition of copolymer l (weight average molecular weight: 18,000) having a solid portion concentration of 30 percent.

The structures of the copolymers d to l are shown in Table 2.

methylethyl ketone and water were distilled away by an evaporator to obtain pigment dispersion K-1 having a pigment concentration of 15 percent by mass.

This pigment dispersion K-1 was a dispersion of polymer coverage pigment particles in which the pigment is covered with the polymer.

Preparation of Pigment Dispersion K-2

Carbon black (NIPEX 150, manufactured by Orion Engineered Carbons SA): 15.0 parts Copolymer b: 50.0 parts Deionized water: 35.0 parts After preliminarily mixing the mixture, a pigment dispersion K-2 having a pigment concentration of 15 percent was obtained by conducting circulation dispersion for ten minutes by a disk-type bead mill (KDL type, manufactured by SHINMARU ENTERPRISES CORPORATION; Media: zirconia ball having a diameter of 0.1 mm) and filtration by a filter having a diameter of 1 μm.

Preparation of Pigment Dispersion K-3

30 parts of FW 100 (carbon black, manufactured by Orion Engineered Carbons SA) was well mixed in 1,000 parts of water. Thereafter, 450 parts of sodium hypochlorite (effective chlorine concentration: 12 mol percent) was dripped to the mixture followed by stirring at 100 degrees C. to 105 degrees C. for eight hours to form a carboxylic acid group on the surface of the pigment by oxidization. Next, 100 parts of sodium hypochlorite (effective chlorine concentration of 12 mol percent) was added to the liquid and the resultant was dispersed by DYNO-MILL KDL A type (manufactured by Willy A. Bachofen AG) which was filled with zirconia beads having a diameter of 0.5 mm at 2,000 rpm for two hours. The obtained slurry was diluted to one-tenth. pH thereof was adjusted by lithium hydroxide followed by salt-removing

TABLE 2

| Copolymer | I:II Molar ratio | R1 | R2 | X | L | Polymerization method | Mw |
|---|---|---|---|---|---|---|---|
| d | 1.0:1.0 | H | $CH_3$ | TEA | $-(CH_2)_6-$ | Solution polymerization | 9200 |
| e | 1.0:1.0 | H | $CH_3$ | TEA | $-(CH_2)_2-$ | Solution polymerization | 8700 |
| f | 1.0:1.0 | H | $CH_3$ | TEA | $-(CH_2)_{12}-$ | Solution polymerization | 8700 |
| g | 1.0:1.0 | H | $CH_3$ | TEA | $-(CH_2)_{16}-$ | Solution polymerization | 9400 |
| h | 1.0:1.0 | $CH_3$ | $CH_3$ | TEA | $-(CH_2)_6-$ | Solution polymerization | 9300 |
| i | 0.5:1.0 | H | $CH_3$ | TEA | $-(CH_2)_6-$ | Solution polymerization | 9100 |
| j | 3.0:1.0 | H | $CH_3$ | TEA | $-(CH_2)_6-$ | Solution polymerization | 8700 |
| k | 4.0:1.0 | H | $CH_3$ | TEA | $-(CH_2)_6-$ | Solution polymerization | 8500 |
| l | 0.4:1.0 | $CH_3$ | $CH_3$ | $NH_4$ | $-(CH_2)_6-$ | Emulsification polymerization | 18000 |

In Table 2, TEA represents tetraethyl ammonium ion.

Preparation of Pigment Dispersion

Preparation of Pigment Dispersion K-1

28 parts of a solution of the copolymer a, 26 parts of carbon black (NIPEX 150, manufactured by Orion Engineered Carbons SA), 13.6 parts of 1 mol/L solution of potassium hydroxide, 20 parts of methylethyl ketone, and 30 parts of deionized water were sufficiently stirred. Thereafter, the resultant was mixed and kneaded 20 times by a three-roll mill (Product name: NR-84A, manufactured by NORITAKE CO., LIMITED). The thus-obtained paste was placed in 200 parts of deionized water and subsequent to sufficient stirring, condensation with an ultra-filtration membrane till an electroconductivity became 0.2 mS/cm. Furthermore, coarse particles by centrifugal followed by filtering with a filter of 1 μm to obtain a pigment dispersion K-3 having a pigment concentration of 15 percent.

Preparation of Pigment Dispersion K-4

Carbon black (NIPEX 150, manufactured by Orion Engineered Carbons SA): 15.0 parts Alkyl naphthalene sodium sulfonate (PELEX NB-L, manufactured by Kao Corporation): 3.0 parts Deionized water: 82.0 parts The dispersant was added to and dissolved in water and the pigment NiPex 150 was mixed and stirred with the solution sufficiently for moistening followed by mixing and kneading by a mixing and kneading machine (DYNO-MILL KDL A type, manufactured by Willy A. Bachofen AG) which was filled with zirconia beads having a diameter of 0.5 mm at 2,000 rpm for 60 minutes.

The mill base was taken out from the mixture and filtered by a filter of 1 μm to obtain a pigment dispersion K-4.

Preparation of Pigment Dispersion K-5

Carbon black (NIPEX 150, manufactured by Orion Engineered Carbons SA): 15.0 parts Copolymer c: 37.5 parts Deionized water: 47.5 parts The copolymer c was added to and dissolved in water and the pigment NIPEX 150 was mixed and stirred with the solution sufficiently for moistening followed by mixing and kneading by a mixing and kneading machine (DYNO-MILL KDL A type, manufactured by Willy A. Bachofen AG) which was filled with zirconia beads having a diameter of 0.5 mm at 2,000 rpm for 60 minutes. The mill base was taken out from the mixture and filtered by a filter of 1 μm to obtain a pigment dispersion K-5.

Preparation of Pigment Dispersion K-6

Carbon black (NIPEX 150, manufactured by Orion Engineered Carbons SA): 15.0 parts Copolymer b: 37.5 parts Deionized water: 47.5 parts The copolymer b was added to and dissolved in water and the pigment NIPEX 150 was mixed and stirred with the solution sufficiently for moistening followed by mixing and kneading by a mixing and kneading machine (DYNO-MILL KDL A type, manufactured by Willy A. Bachofen AG) which was filled with zirconia beads having a diameter of 0.5 mm at 2,000 rpm for 60 minutes. The mill base was taken out from the mixture and filtered by a filter of 1 μm to obtain a pigment dispersion K-6.

Preparation of Pigment Dispersion K-7

100 g of Black Pearls® 1000 (carbon black having a BET specific surface area of 343 m²/g and a DBPA of 105 ml/100 g, manufactured by Cabot Corporation), 100 millimole of the compound represented by Chemical formula 7, and 1 litter of deionized water by a Silverson Mixer at 6,000 rpm in room temperature environment. When an obtained slurry had a pH of 4 or higher, 100 mmol of nitric acid was added. 30 minutes later, 100 mmol of sodium nitrite dissolved in a minute amount of deionized water was slowly added to the mixture. Furthermore, the resultant was heated to 60 degrees C. while being stirred to conduct reaction for one hour. The compound represented by Chemical formula 7 was added to the surface of carbon black and a pigment dispersion was obtained containing the pigment bonded with at least one geminalbis phosphonic acid group or sodium salt of geminalbis phosphonic acid 30 minutes after the pH was adjusted to 10 by NaOH aqueous solution. Deionized water was added to the resultant followed by ultra filtration and thereafter ultrasonic dispersion to obtain a pigment dispersion K-7 which was condensed to have a pigment solid portion of 15 percent.

Chemical formula 7

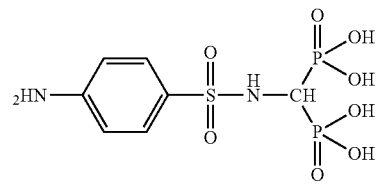

Preparation of Pigment Dispersion K-8

Carbon black (NIPEX 150, manufactured by Orion Engineered Carbons SA): 15.0 parts Copolymer d: 37.5 parts Deionized water: 47.5 parts The copolymer d was added to and dissolved in deionized water and the pigment NIPEX 150 was mixed and stirred with the solution sufficiently for moistening followed by mixing and kneading by a mixing and kneading machine (DYNO-MILL KDL A type, manufactured by Willy A. Bachofen AG) which was filled with zirconia beads having a diameter of 0.5 mm at 2,000 rpm for 60 minutes. The mill base was taken out from the mixture and filtered by a filter of 1 μm to obtain a black pigment dispersion K-8.

Preparation of Pigment Dispersion K-9

Black pigment dispersion K-9 was obtained in the same manner as in the preparation of the black pigment dispersion K-8 except that the copolymer d was changed to the copolymer e.

Preparation of Pigment Dispersion K-10

Black pigment dispersion K-10 was obtained in the same manner as in the preparation of the black pigment dispersion K-8 except that the copolymer d was changed to the copolymer f.

Preparation of Pigment Dispersion K-11

Black pigment dispersion K-11 was obtained in the same manner as in the preparation of the black pigment dispersion K-8 except that the copolymer d was changed to the copolymer g.

Preparation of Pigment Dispersion K-12

Black pigment dispersion K-12 was obtained in the same manner as in the preparation of the black pigment dispersion K-8 except that the copolymer d was changed to the copolymer h.

Preparation of Pigment Dispersion K-13

Black pigment dispersion K-13 was obtained in the same manner as in the preparation of the black pigment dispersion K-8 except that the copolymer d was changed to the copolymer i.

Preparation of Pigment Dispersion K-14

Black pigment dispersion K-14 was obtained in the same manner as in the preparation of the black pigment dispersion K-8 except that the copolymer d was changed to the copolymer j.

Preparation of Pigment Dispersion K-15

Black pigment dispersion K-15 was obtained in the same manner as in the preparation of the black pigment dispersion K-8 except that the copolymer d was changed to the copolymer k.

Preparation of Dispersion Element of Cyan Pigment

Preparation of Pigment Dispersion C-1

A pigment dispersion C-1 having a pigment concentration of 15 percent was obtained in the same manner and recipe as those in the pigment dispersion K-2 except that carbon black (NIPEX 150, manufactured by Orion Engineered Carbons SA) of the pigment dispersion K-2 was changed to HELIOGENBlue D7079 (C.I. Pigment Blue 15:3, manufactured by BASF Japan Ltd.).

Preparation of Pigment Dispersion C-2

A pigment dispersion C-2 having a pigment concentration of 15 percent was obtained in the same manner and recipe as those in the pigment dispersion K-6 except that carbon black (NIPEX 150, manufactured by Orion Engineered Carbons SA) of the pigment dispersion K-6 was changed to HELIOGENBlue D7079 (C.I. Pigment Blue 15:3, manufactured by BASF Japan Ltd.).

Preparation of Pigment Dispersion C-3

A pigment dispersion C-3 having a pigment concentration of 15 percent was obtained in the same manner and recipe as those in the pigment dispersion C-2 except that the copolymer b was changed to the copolymer d.

Preparation of Dispersion Element of Magenta Pigment

Preparation of Pigment Dispersion M-1

A pigment dispersion M-1 having a pigment concentration of 15 percent was obtained in the same manner and recipe as those in the pigment dispersion K-2 except that carbon black (NIPEX 150, manufactured by Orion Engineered Carbons SA) of the pigment dispersion K-2 was changed to CROMOPHTAL JET MAGENTA DMQ (C.I. Pigment Red 122, manufactured by BASF Japan Ltd.).

Preparation of Pigment Dispersion M-2

A pigment dispersion M-2 having a pigment concentration of 15 percent was obtained in the same manner and recipe as those in the pigment dispersion K-6 except that carbon black (NIPEX 150, manufactured by Orion Engineered Carbons SA) of the pigment dispersion K-6 was changed to CROMOPHTAL JET MAGENTA DMQ (C.I. Pigment Red 122, manufactured by BASF Japan Ltd.).

Preparation of Pigment Dispersion M-3

A pigment dispersion M-3 having a pigment concentration of 15 percent was obtained in the same manner and recipe as those in the pigment dispersion M-2 except that the copolymer b was changed to the copolymer d.

Preparation of Dispersion Element of Yellow Pigment

Preparation of Pigment Dispersion Y-1

A pigment dispersion Y-1 having a pigment concentration of 15 percent was obtained in the same manner and recipe as those in the pigment dispersion K-2 except that carbon black (NIPEX 150, manufactured by Orion Engineered Carbons SA) of the pigment dispersion K-2 was changed to Ink Jet Yellow 4G (C.I. Pigment Yellow 155, manufactured by Clariant Japan K.K.).

Preparation of Pigment Dispersion Y-2

A pigment dispersion Y-2 having a pigment concentration of 15 percent was obtained in the same manner and recipe as those in the pigment dispersion K-6 except that carbon black (NIPEX 150, manufactured by Orion Engineered Carbons SA) of the pigment dispersion K-6 was changed to Ink Jet Yellow 4G (C.I. Pigment Yellow 155, manufactured by Clariant Japan K.K.).

Preparation of Pigment Dispersion Y-3

A pigment dispersion Y-3 having a pigment concentration of 15 percent was obtained in the same manner and recipe as those in the pigment dispersion Y-2 except that the copolymer b was changed to the copolymer d.

The names and abbreviations of the water soluble solvents for use in Examples and Comparative Examples and the calculated SP values are shown in Table 3.

TABLE 3

| Solvent name | Abbreviation | SP Value |
| --- | --- | --- |
| Ethylene glycol monoethyl ether | EGMEE | 23.5 |
| Ethylene glycol monobutyl ether | EGMBE | 22.1 |
| Glycerin | GLY | 16.4 |
| Ethylene glycol | EG | 14.2 |
| 1,3-butane diol | 13BD | 12.8 |
| 3-methyl-1,3-butane diol | MBD | 12.1 |
| 1,2-hexane diol | 12HD | 11.8 |
| N-methyl-2-pyrrolidone | NMP | 11.2 |
| 2-pyrrolidone | 2P | 11.2 |
| 2-ethyl-1,3-hexane diol | EHD | 11.1 |
| 3-ethyl-3-hydroxymethyl oxetane | EHO | 10.7 |
| N,N-dimethyl-β-methoxy propionamide | M100 | 10.3 |
| Methyltriglycol | MTG | 10.1 |
| 3-methoxy-1-butanol | MB | 10.0 |
| N,N-dimethyl-β-butoxy propionamide | B100 | 9.8 |
| Isopropylidene glycerol | iPDG | 9.8 |
| Dipropylene glycol mono-propyl ether | PFDG | 9.5 |
| Tripropyleneglycol monomethylether | MFTG | 9.4 |

Example I-1

Preparation of Ink

After manufacturing a vehicle by dissolving the materials of the following recipe in deionized water, the vehicle was mixed with the pigment dispersion K-1 followed by filtration by a filter having an opening of 1 μm to obtain a black ink.

Ink Recipe

Pigment dispersion K-1: 40.0 parts
Methyltriglycol (SP value: 10.1): 6.0 parts
1,3-butane diol (SP value: 12.8): 15.0 parts
Glycerin (SP value: 16:4): 15.0 parts
2-ethyl-1,3-hexane diol (SP value: 11.1): 2.0 parts
Carnauba wax (Selosol 524, solid portion: 30 percent, manufactured by CHUKYO YUSHI CO., LTD.): 5.0 parts
EMALGEN LS-106 (polyoxyethylene polyoxypropylene alkyl ether, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 15.4 parts Example I-2

Preparation of Ink

After manufacturing a vehicle by dissolving the materials of the following recipe other than the pigment dispersion K-1 in deionized water, the vehicle was mixed with the pigment dispersion K-1 followed by filtration by a filter having an opening of 1 μm to obtain a black ink.

Ink Recipe

Pigment dispersion K-1: 40.0 parts
3-ethyl-3-hydroxymethyl oxetane (SP value: 10.7): 17.0 parts
N-methyl-2-pyrrolidone (SP value: 11.2): 19.0 parts
2-ethyl-1,3-hexane diol (SP value: 11.1): 2.0 parts
Polyethylene wax (AQUACER 531, solid portion: 45 percent, manufactured by BYK Chemie Japan): 3.3 parts
Polyoxyethylene polyoxypropylene alkyl ether (EMALGEN LS-106, manufactured by KAO CORPORATION): 1.0 part
2-amino-2-ethyl-1,3-propane diol: 0.5 parts Preservatives and fungicides (PROXEL™ LV, manufactured by ARCH CHEMICALS JAPAN, INC.): 0.1 parts
Deionized water: 17.1 parts Example I-3

Preparation of Ink
After manufacturing a vehicle by dissolving the materials of the following recipe other than the pigment dispersion K-1 in deionized water, the vehicle was mixed with the pigment dispersion K-1 followed by filtration by a filter having an opening of 1 μm to obtain a black ink.
Ink Recipe
Pigment dispersion K-1: 40.0 parts
Dipropylene glycol mono-propyl ether (SP value: 9.5): 21.0 parts
Ethylene glycol monobutyl ether (SP value: 22.1): 15.0 parts
2-ethyl-1,3-hexane diol (SP value: 11.1): 2.0 parts
Polyethelene wax (HYTEC E-6500, solid portion: 35 percent, manufactured by TOHO Chemical Industry Co., Ltd.): 4.3 parts
Surfactant represented by the Chemical formula 2: 1.0 part Chemical formula 2

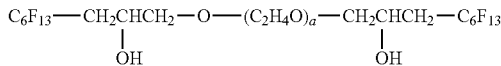

2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.4 parts Example I-4

A black ink was obtained in the same recipe and manner as those in Example I-3 except that dipropylene glycol mono-propyl ether (SP value: 9.5) was changed to methyltriglycol (SP value: 10.1) and the surfactant represented by Chemical formula 2 was changed to polyoxyethylene polyoxypropylene alkyl ether (EMALGEN LS-106, manufactured by KAO CORPORATION).

Example I-5

A black ink was obtained in the same recipe and manner as those in Example I-4 except that ethylene glycol monobutyl ether (SP value: 22.1) was changed to ethylene glycol (SP value: 14.2) and the surfactant (EMALGEN LS-106 was changed to the surfactant represented by Chemical formula 1.

Example I-6

A black ink was obtained in the same recipe and manner as those in Example I-3 except that dipropylene glycol mono-propyl ether (SP value: 9.5) was changed to tripeopylene glycol monomethylether (SP value: 9.4), ethylene glycol monobutyl ether (SP value: 22.1) was changed to ethylene glycol monoethylether (SP value: 23.5), and the surfactant represented by Chemical formula 2 was changed to the surfactant represented by Chemical formula 1.

Example I-7

A black ink was obtained in the same recipe and manner as those in Example I-6 except that 15.0 parts of ethylene glycol monoethylether (SP value: 23.5) was changed to 10.0 parts of 3-methyl-1,3-butane diol (SP value: 12.1) and 5.0 parts of 1.2-hexane diol (SP value: 11.8).

Example I-8

Preparation of Ink
After manufacturing a vehicle by dissolving the materials of the following recipe other than the pigment dispersion K-2 in deionized water, the vehicle was mixed with the pigment dispersion K-2 followed by filtration by a filter having an opening of 1 μm to obtain a black ink.
Ink Recipe
Pigment dispersion K-2: 40.0 parts
N,N-dimethyl-β-butoxy propion amide (EQUAMIDE™ B100, SP value: 9.8, manufactured by Idemitsu Kosan Co., Ltd.): 15.0 parts
1,3-butane diol (SP value: 12.8): 21.0 parts
2-ethyl-1,3-hexane diol (SP value: 11.1): 2.0 parts
Polyethylene wax (AQUACER 515, solid portion: 35 percent, manufactured by BYK Chemie Japan): 4.3 parts
Surfactant represented by the Chemical formula 1: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.1 parts Example I-9

Preparation of Ink
A cyan ink was prepared in the same manner and recipe as in Example I-8 except that the pigment dispersion K-2 was changed to the pigment dispersion C-1.

Example I-10

Preparation of Ink
A magenta ink was prepared in the same manner and recipe as in Example I-8 except that the pigment dispersion K-2 was changed to the pigment dispersion M-1.

Example I-11

Preparation of Ink
A yellow ink was prepared in the same manner and recipe as in Example I-8 except that the pigment dispersion K-2 was changed to the pigment dispersion Y-1.

Example I-12

Preparation of Ink
After manufacturing a vehicle by dissolving the materials of the following recipe other than the pigment dispersion K-3 in deionized water, the vehicle was mixed with the pigment dispersion K-3 followed by filtration by a filter having an opening of 1 μm to obtain a black ink.
Ink Recipe
Pigment dispersion K-3: 40.0 parts
3-ethyl-3-hydroxymethyl oxetane (SP value: 10.7): 4.0 parts
Glycerin (SP value: 16:4): 32.0 parts 2-ethyl-1,3-hexane diol (SP value: 11.1): 2.0 parts
Polyethylene wax (AQUACER 515, solid portion: 35 percent, manufactured by BYK Chemie Japan): 4.3 parts
Surfactant represented by the Chemical formula 1: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.1 parts Example I-13

A black ink was obtained in the same recipe and manner as those in Example I-12 except that 4.0 parts of 3-ethyl-3-hydroxymethyl oxetane (SP value: 10.7) was changed to 18.0 parts and 32.0 parts of glycerin (SP value: 16.4) was changed to 18.0 parts.

Example I-14

A black ink was obtained in the same recipe and manner as those in Example I-12 except that 4.0 parts of 3-ethyl-3-hydroxymethyl oxetane (SP value: 10.7) was changed to 36.0 parts and 32.0 parts of glycerin (SP value: 16.4) was changed to 0.0 parts.

Example I-15

Preparation of Ink
After manufacturing a vehicle by dissolving the materials of the following recipe other than the pigment dispersion K-3 in deionized water, the vehicle was mixed with the pigment dispersion K-3 followed by filtration by a filter having an opening of 1 μm to obtain a black ink.
Ink Recipe
Pigment dispersion K-3: 40.0 parts
Isopropylidene glycerol (SP value: 9.8): 13.0 parts
N,N-dimethyl-β-methoxy propionamide (EQUAMIDE™ M100, SP value: 10.3, manufactured by Idemitsu Kosan Co., Ltd.): 18.0 parts
2-pyrroridone (SP value: 11.2): 5.0 parts
2-ethyl-1,3-hexane diol (SP value: 11.1): 2.0 parts
Polyethylene wax (AQUACER 531, solid portion: 45 percent, manufactured by BYK Chemie Japan): 3.3 parts
Polyoxyethylene polyoxypropylene alkylether (EMALGEN LS-106, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 17.1 parts Example I-16

A black ink was obtained in the same recipe and manner as those in Example I-15 except that 3.3 parts of polyethylene wax (AQUACER 531, solid portion: 45 percent, manufactured by BYK Chemie Japan) was changed to 4.3 parts of polyethylene wax (AQUACER 515, solid portion: 35 percent, manufactured by BYK Chemie Japan) and 17.1 parts of deionized water was changed to 16.1 parts.

Example I-17

A black ink was obtained in the same recipe and manner as those in Example I-15 except that 3.3 parts of polyethylene wax (AQUACER 531, solid portion: 45 percent, manufactured by BYK Chemie Japan) was changed to 3.8 parts of polyethylene wax (HYTEC E-8237, solid portion: 40 percent, manufactured by TOHO Chemical Industry Co., Ltd.) and 17.1 parts of deionized water was changed to 16.6 parts.

Example I-18

A black ink was obtained in the same recipe and manner as those in Example I-15 except that 3.3 parts of polyethylene wax (AQUACER 531, solid portion: 45 percent, manufactured by BYK Chemie Japan) was changed to 4.3 parts of polyethylene wax (HYTEC P-9018, solid portion: 35 percent, manufactured by TOHO Chemical Industry Co., Ltd.) and 17.1 parts of deionized water was changed to 16.1 parts.

Example I-19

A black ink was obtained in the same recipe and manner as those in Example I-15 except that 3.3 parts of polyethylene wax (AQUACER 531, solid portion: 45 percent, manufactured by BYK Chemie Japan) was changed to 5.0 parts of carnauba wax (Selosol 524, solid portion: 30 percent, manufactured by CHUKYO YUSHI CO., LTD.) and 17.1 parts of deionized water was changed to 15.4 parts.

Example I-20

A black ink was obtained in the same recipe and manner as those in Example I-15 except that 3.3 parts of polyethylene wax (AQUACER 531, solid portion: 45 percent, manufactured by BYK Chemie Japan) was changed to 3.8 parts of polyolefin wax (Nopcoat PEM-17, solid portion: 40 percent, manufactured by SAN NOPCO LIMITED) and 17.1 parts of deionized water was changed to 16.6 parts.

Example I-21

A black ink was obtained in the same recipe and manner as those in Example I-8 except that 4.3 parts of polyethylene wax (AQUACER 515, solid portion: 35 percent, manufactured by BYK Chemie Japan) was changed to 2.3 parts and 16.1 parts of deionized water was changed to 18.1 parts.

Example I-22

A black ink was obtained in the same recipe and manner as those in Example I-8 except that 4.3 parts of polyethylene wax (AQUACER 515, solid portion: 35 percent, manufactured by BYK Chemie Japan) was changed to 7.1 parts and 16.1 parts of deionized water was changed to 13.3 parts.

Example I-23

A black ink was obtained in the same recipe and manner as those in Example I-16 except that isopropylidene glycerol (SP value: 9.8) was changed to N,N-dimethyl-β-butoxy propionamide (EQUAMIDE™ B 100, SP value: 9.8, manufactured by Idemitsu Kosan Co., Ltd.).

Comparative Example I-1

A cyan ink was obtained in the same recipe and manner as those in Example I-9 except that 15.0 parts of N,N-dimethyl-β-butoxy propionamide (SP value: 9.8) was changed to 0.0 parts and 21.0 parts of 1,3-butanediol (SP value: 12.8) was changed to 36.0 parts.

Comparative Example I-2

A black ink was obtained in the same recipe and manner as those in Example I-19 except that 13.0 parts of isopropylidene glycerol (SP value: 9.8), 18.0 parts of N,N-dimethyl-β-methoxy propionamide (SP value: 10.3), and 5.0 parts of 2-pyrolidone (SP value: 11.2) were changed to 36.0 parts of glycerin (SP value: 16.4).

Comparative Example I-3

A black ink was obtained in the same recipe and manner as those in Example I-13 except that 4.3 parts of polyethylene wax (AQUACER 515, solid portion: 35 percent, manufactured by BYK Chemie Japan) was changed to 4.3 parts of deionized water.

Comparative Example I-4

A black ink was obtained in the same recipe and manner as those in Example I-3 except that 4.3 parts of polyethylene wax (HYTEC E-6500, solid portion: 35 percent, manufactured by TOHO Chemical Industry Co., Ltd.) was changed to 4.3 parts of deionized water.

Comparative Example I-5

A black ink was obtained in the same recipe and manner as those in Example I-3 except that 4.3 parts of polyethylene wax (HYTEC E-6500, solid portion: 35 percent, manufactured by TOHO Chemical Industry Co., Ltd.) was changed to 2.0 parts and 16.4 parts of deionized water was changed to 18.7 parts.

Comparative Example I-6

A black ink was obtained in the same recipe and manner as those in Example I-22 except that 15.0 parts of N,N-dimethyl-β-butoxy propionamide (EQUAMIDE™ B 100, SP value: 9.8, manufactured by Idemitsu Kosan Co., Ltd.) was changed to 5.0 parts and 21.0 parts of 1,3-butanediol (SP value: 12.8) was changed to 31.0 parts.

The ink recipes of Examples I-1 to I-23 and Comparative Examples I-1 to I-6 are shown in Table 4 and the evaluation results are shown in Table 5.

TABLE 4

| | Dispersion | Wax | | Surfactant | |
|---|---|---|---|---|---|
| Example I-1 | K-1 | Selosol 524 | 1.50% | LS-106 | 1% |
| Example I-2 | K-1 | AQUACER 531 | 1.49% | LS-106 | 1% |
| Example I-3 | K-1 | HYTEC E-6500 | 1.51% | Chemical formula 2 | 1% |
| Example I-4 | K-1 | HYTEC E-6500 | 1.51% | LS-106 | 1% |
| Example I-5 | K-1 | HYTEC E-6500 | 1.51% | Chemical formula 1 | 1% |
| Example I-6 | K-1 | HYTEC E-6500 | 1.51% | Chemical formula 1 | 1% |
| Example I-7 | K-1 | HYTEC E-6500 | 1.51% | Chemical formula 1 | 1% |
| Example I-8 | K-2 | AQUACER 515 | 1.51% | Chemical formula 1 | 1% |
| Example I-9 | C-1 | AQUACER 515 | 1.51% | Chemical formula 1 | 1% |
| Example I-10 | M-1 | AQUACER 515 | 1.51% | Chemical formula 1 | 1% |
| Example I-11 | Y-1 | AQUACER 515 | 1.51% | Chemical formula 1 | 1% |
| Example I-12 | K-3 | AQUACER 515 | 1.51% | Chemical formula 1 | 1% |
| Example I-13 | K-3 | AQUACER 515 | 1.51% | Chemical formula 2 | 1% |
| Example I-14 | K-3 | AQUACER 515 | 1.51% | Chemical formula 2 | 1% |
| Example I-15 | K-3 | AQUACER 531 | 1.49% | LS-106 | 1% |
| Example I-16 | K-3 | AQUACER 515 | 1.51% | LS-106 | 1% |
| Example I-17 | K-3 | HYTEC E-8237 | 1.52% | LS-106 | 1% |
| Example I-18 | K-3 | HYTEC P-9018 | 1.51% | LS-106 | 1% |
| Example I-19 | K-3 | Selosol 524 | 1.50% | LS-106 | 1% |
| Example I-20 | K-3 | Nopcoat PEM-17 | 1.52% | LS-106 | 1% |
| Example I-21 | K-2 | AQUACER 515 | 0.81% | Chemical formula 1 | 1% |
| Example I-22 | K-2 | AQUACER 515 | 2.49% | Chemical formula 1 | 1% |
| Example I-23 | K-3 | AQUACER 515 | 1.51% | LS-106 | 1% |
| Comparative Example I-1 | C-1 | AQUACER 515 | 1.51% | Chemical formula 1 | 1% |
| Comparative Example I-2 | K-3 | Selosol 524 | 1.50% | LS-106 | 1% |
| Comparative Example I-3 | K-3 | — | | Chemical formula 2 | 1% |
| Comparative Example I-4 | K-1 | — | | Chemical formula 2 | 1% |
| Comparative Example I-5 | K-1 | HYTEC E-6500 | 0.70% | Chemical formula 2 | 1% |
| Comparative Example I-6 | K-2 | AQUACER 515 | 2.49% | Chemical formula 1 | 1% |

| | Solvent | | | | | | |
|---|---|---|---|---|---|---|---|
| | 9 ≤ SP value ≤ 11 | | | | SP value < 9 or 11 < SP value | | |
| Example I-1 | — | | MTG | 6% | EHD 2% | 13BD 15% | GLY 15% |
| Example I-2 | EHO 17% | | — | | EHD 2% | NMP 19% | — |
| Example I-3 | — | | PFDG | 21% | EHD 2% | EGMBE 15% | — |
| Example I-4 | — | | MTG | 21% | EHD 2% | EGMBE 15% | — |
| Example I-5 | — | | MTG | 21% | EHD 2% | EG 15% | — |
| Example I-6 | — | | MFTG | 21% | EHD 2% | EG 15% | — |

TABLE 4-continued

| | | | | | | | | | |
|---|---|---|---|---|---|---|---|---|---|
| Example I-7 | — | | MFTG | 21% | EHD | 2% | MBD | 10% | 12HD 5% |
| Example I-8 | B100 | 15% | — | | EHD | 2% | 13BD | 21% | — |
| Example I-9 | B100 | 15% | — | | EHD | 2% | 13BD | 21% | — |
| Example I-10 | B100 | 15% | — | | EHD | 2% | 13BD | 21% | — |
| Example I-11 | B100 | 15% | — | | EHD | 2% | 13BD | 21% | — |
| Example I-12 | EHO | 4% | — | | EHD | 2% | GLY | 32% | — |
| Example I-13 | EHO | 18% | — | | EHD | 2% | GLY | 18% | — |
| Example I-14 | EHO | 36% | — | | EHD | 2% | — | | — |
| Example I-15 | iPDG | 13% | M100 | 18% | EHD | 2% | 2P | 5% | — |
| Example I-16 | iPDG | 13% | M100 | 18% | EHD | 2% | 2P | 5% | — |
| Example I-17 | iPDG | 13% | M100 | 18% | EHD | 2% | 2P | 5% | — |
| Example I-18 | iPDG | 13% | M100 | 18% | EHD | 2% | 2P | 5% | — |
| Example I-19 | iPDG | 13% | M100 | 18% | EHD | 2% | 2P | 5% | — |
| Example I-20 | iPDG | 13% | M100 | 18% | EHD | 2% | 2P | 5% | — |
| Example I-21 | B100 | 15% | — | | EHD | 2% | 13BD | 21% | — |
| Example I-22 | B100 | 15% | — | | EHD | 2% | 13BD | 21% | — |
| Example I-23 | B100 | 13% | M100 | 18% | EHD | 2% | 2P | 5% | — |
| Comparative Example I-1 | — | | — | | EHD | 2% | 13BD | 36% | — |
| Comparative Example I-2 | — | | — | | EHD | 2% | GLY | 36% | — |
| Comparative Example I-3 | EHO | 18% | — | | EHD | 2% | GLY | 18% | — |
| Comparative Example I-4 | — | | PFDG | 21% | EHD | 2% | EGMBE | 15% | — |
| Comparative Example I-5 | — | | PFDG | 21% | EHD | 2% | EGMBE | 15% | — |
| Comparative Example I-6 | B100 | 5% | — | | EHD | 2% | 13BD | 31% | — |

| | 9 ≤ SP value ≤ 11 Solvent content ratio | Wax:Solvent (9 ≤ SP value ≤ 11) |
|---|---|---|
| Example I-1 | 15.8% | 1.0:4.0 |
| Example I-2 | 44.7% | 1.0:11.4 |
| Example I-3 | 55.3% | 1.0:14.0 |
| Example I-4 | 55.3% | 1.0:14.0 |
| Example I-5 | 55.3% | 1.0:14.0 |
| Example I-6 | 55.3% | 1.0:14.0 |
| Example I-7 | 55.3% | 1.0:14.0 |
| Example I-8 | 39.5% | 1.0:10.0 |
| Example I-9 | 39.5% | 1.0:10.0 |
| Example I-10 | 39.5% | 1.0:10.0 |
| Example I-11 | 39.5% | 1.0:10.0 |
| Example I-12 | 10.5% | 1.0:2.7 |
| Example I-13 | 47.4% | 1.0:12.0 |
| Example I-14 | 94.7% | 1.0:23.9 |
| Example I-15 | 81.6% | 1.0:20.9 |
| Example I-16 | 81.6% | 1.0:20.6 |
| Example I-17 | 81.6% | 1.0:20.4 |
| Example I-18 | 81.6% | 1.0:20.6 |
| Example I-19 | 81.6% | 1.0:20.7 |
| Example I-20 | 81.6% | 1.0:20.4 |
| Example I-21 | 39.5% | 1.0:18.6 |
| Example I-22 | 39.5% | 1.0:6.0 |
| Example I-23 | 81.6% | 1.0:20.6 |
| Comparative Example I-1 | 0.0% | 1.0:0.0 |
| Comparative Example I-2 | 0.0% | 1.0:0.0 |
| Comparative Example I-3 | 47.4% | — |
| Comparative Example I-4 | 55.3% | — |

TABLE 4-continued

| | | |
|---|---|---|
| Comparative Example I-5 | 55.3% | 1.0:30.0 |
| Comparative Example I-6 | 13.2% | 1.0:2.0 |

TABLE 5

| | Storage stability | Discharging stability | Image density Plain paper 1 | Plain paper 2 | Abrasion resistance Plain paper 1 | Plain paper 2 |
|---|---|---|---|---|---|---|
| Example I-1 | B | B | B | B | B | B |
| Example I-2 | B | B | B | A | A | B |
| Example I-3 | B | B | B | A | A | B |
| Example I-4 | B | B | B | B | A | B |
| Example I-5 | B | B | B | A | A | B |
| Example I-6 | B | B | B | A | A | B |
| Example I-7 | B | B | B | A | A | B |
| Example I-8 | B | A | A | A | A | A |
| Example I-9 | B | A | A | A | A | A |
| Example I-10 | B | A | A | A | A | A |
| Example I-11 | B | A | A | A | A | A |
| Example I-12 | B | B | A | A | A | A |
| Example I-13 | B | A | A | A | A | A |
| Example I-14 | A | A | A | A | A | A |
| Example I-15 | A | A | A | A | A | B |
| Example I-16 | A | A | A | A | A | A |
| Example I-17 | A | A | A | A | A | B |
| Example I-18 | B | B | A | A | B | B |
| Example I-19 | B | B | A | A | B | B |
| Example I-20 | B | B | A | A | B | B |
| Example I-21 | B | A | A | A | B | A |
| Example I-22 | B | A | A | A | A | A |
| Example I-23 | A | A | A | A | A | A |
| Comparative Example I-1 | C | D | C | B | A | A |
| Comparative Example I-2 | D | D | C | C | B | B |
| Comparative Example I-3 | B | A | B | A | C | D |
| Comparative Example I-4 | B | B | B | B | D | D |
| Comparative Example I-5 | D | C | C | C | B | C |
| Comparative Example I-6 | C | D | B | C | A | A |

Example II-1

After manufacturing a vehicle by dissolving the materials of the following recipe other than the pigment dispersion K-4 in deionized water, the vehicle was mixed with the pigment dispersion K-4 followed by filtration by a filter having an opening of 1 μm to obtain a black ink.
Ink Recipe
Pigment dispersion K-4: 40.0 parts
Copolymer b: 15.0 parts
Polyethelene wax (HYTEC E-6500, solid portion: 35 percent, manufactured by TOHO Chemical Industry Co., Ltd.): 4.0 parts
Isoprovinylidene glycerol: 30.0 parts
2-pyrolidone: 6.0 parts
2-ethyl-1,3-hexane diol: 2.0 parts
Polyoxyethylene polyoxypropylene alkylether (EMALGEN LS-106, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water 1.4 parts Example II-2

After manufacturing a vehicle by dissolving the materials of the following recipe other than the pigment dispersion K-5 in deionized water, the vehicle was mixed with the pigment dispersion K-5 followed by filtration by a filter having an opening of 1 μm to obtain a black ink.
Ink Recipe
Pigment dispersion K-5: 40.0 parts
Polyethelene wax (HYTEC E-6500, solid portion: 35 percent, manufactured by TOHO Chemical Industry Co., Ltd.): 4.0 parts
Isoprovinylidene glycerol: 30.0 parts
2-pyrolidone: 6.0 parts
2-ethyl-1,3-hexane diol: 2.0 parts
Surfactant represented by the Chemical formula 1: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.4 parts Example II-3

After manufacturing a vehicle by dissolving the materials of the following recipe other than the pigment dispersion K-5 in deionized water, the vehicle was mixed with the pigment dispersion K-5 followed by filtration by a filter having an opening of 1 μm to obtain a black ink.
Ink Recipe
Pigment dispersion K-5: 40.0 parts
Polyethylene wax (AQUACER 515, solid portion: 45 percent, manufactured by BYK Chemie Japan): 3.3 parts
N,N-dimethyl-β-butoxy propionamide (EQUAMIDE™ B 100, manufactured by Idemitsu Kosan Co., Ltd.): 10.0 parts
1,3-butane diol: 10.0 parts
Glycerin: 16.0 parts
2-ethyl-1,3-hexane diol: 2.0 parts
Surfactant represented by the Chemical formula 2: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 17.1 parts Example II-4

A magenta ink was prepared in the same manner and recipe as in Example II-3 except that the pigment dispersion K-5 was changed to the pigment dispersion K-6.

Example II-5

A cyan ink was prepared in the same manner and recipe as in Example II-3 except that the pigment dispersion K-5 was changed to the pigment dispersion C-2.

Example II-6

A magenta ink was prepared in the same manner and recipe as in Example II-3 except that the pigment dispersion K-5 was changed to the pigment dispersion M-2.

Example II-7

A yellow ink was prepared in the same manner and recipe as in Example II-3 except that the pigment dispersion K-5 was changed to the pigment dispersion Y-2.

Example II-8

After manufacturing a vehicle by dissolving the materials of the following recipe other than the pigment dispersion K-7 in deionized water, the vehicle was mixed with the pigment dispersion K-7 followed by filtration by a filter having an opening of 1 μm to obtain a black ink.
Ink Recipe
Pigment dispersion K-7: 40.0 parts
Polyethylene wax (AQUACER 531, solid portion: 45 percent, manufactured by BYK Chemie Japan): 3.3 parts
3-ethyl-3-hydroxymethyl oxetane: 15.0 parts
1,3-butane diol: 15.0 parts
2-pyrolidone: 6.0 parts
2-ethyl-1,3-hexane diol: 2.0 parts
Surfactant represented by the Chemical formula 1: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 17.1 parts

Example II-9

A black ink was obtained in the same recipe and manner as those in Example II-8 except that 3.3 parts of polyethylene wax (AQUACER 531, solid portion: 45 percent, manufactured by BYK Chemie Japan) was changed to 4.3 parts of polyethylene wax (AQUACER 515, solid portion: 35 percent, manufactured by BYK Chemie Japan) and 17.1 parts of deionized water was changed to 16.1 parts.

Example II-10

A black ink was obtained in the same recipe and manner as those in Example II-8 except that 3.3 parts of polyethylene wax (AQUACER 531, solid portion: 45 percent, manufactured by BYK Chemie Japan) was changed to 3.8 parts of polyethylene wax (HYTEC E-8237, solid portion: 40 percent, manufactured by TOHO Chemical Industry Co., Ltd.) and 17.1 parts of deionized water was changed to 16.6 parts.

Example II-11

A black ink was obtained in the same recipe and manner as those in Example II-8 except that 3.3 parts of polyethylene wax (AQUACER 531, solid portion: 45 percent, manufactured by BYK Chemie Japan) was changed to 4.3 parts of polyethylene wax (HYTEC P-9018, solid portion: 35 percent, manufactured by TOHO Chemical Industry Co., Ltd.) and 17.1 parts of deionized water was changed to 16.1 parts.

Example II-12

A black ink was obtained in the same recipe and manner as those in Example II-8 except that 3.3 parts of polyethylene wax (AQUACER 531, solid portion: 45 percent, manufactured by BYK Chemie Japan) was changed to 5.0 parts of carnauba wax (Selosol 524, solid portion: 30 percent, manufactured by CHUKYO YUSHI CO., LTD.) and 17.1 parts of deionized water was changed to 15.4 parts.

Example II-13

A black ink was obtained in the same recipe and manner as those in Example II-8 except that 3.3 parts of polyethylene wax (AQUACER 531, solid portion: 45 percent, manufactured by BYK Chemie Japan) was changed to 3.8 parts of polyolefin wax (Nopcoat PEM-17, solid portion: 40 percent, manufactured by SAN NOPCO LIMITED) and 17.1 parts of deionized water was changed to 16.6 parts.

Comparative Example II-1

A black ink was obtained in the same recipe and manner as those in Example II-8 except that 3.3 parts of polyethylene wax (AQUACER 531, solid portion: 45 percent, manufactured by BYK Chemie Japan) was changed to 3.3 parts of deionized water.

Comparative Example II-2

A black ink was obtained in the same recipe and manner as those in Example II-3 except that 4.3 parts of polyethylene wax (AQUACER 515, solid portion: 35 percent, manufactured by BYK Chemie Japan) was changed to 4.3 parts of deionized water. The ink recipes of Examples II-1 to II-13 and Comparative Examples II-1 to II-2 are shown in Table 6 and the evaluation results are shown in Table 7.

TABLE 6

| | Dispersion | Wax | | Surfactant | |
|---|---|---|---|---|---|
| Example II-1 | K-4 | HYTEC E-6500 | 1.5% | LS-106 | 1% |
| Example II-2 | K-5 | HYTEC E-6500 | 1.5% | Chemical formula 1 | 1% |
| Example II-3 | K-5 | AQUACER 515 | 1.5% | Chemical formula 2 | 1% |
| Example II-4 | K-6 | AQUACER 515 | 1.5% | Chemical formula 2 | 1% |
| Example II-5 | C-2 | AQUACER 515 | 1.5% | Chemical formula 2 | 1% |
| Example II-6 | M-2 | AQUACER 515 | 1.5% | Chemical formula 2 | 1% |
| Example II-7 | Y-2 | AQUACER 515 | 1.5% | Chemical formula 2 | 1% |
| Example II-8 | K-7 | AQUACER 531 | 1.5% | Chemical formula 1 | 1% |
| Example II-9 | K-7 | AQUACER 515 | 1.5% | Chemical formula 1 | 1% |
| Example II-10 | K-7 | HYTEC E-8237 | 1.5% | Chemical formula 1 | 1% |
| Example II-11 | K-7 | HYTEC P-9018 | 1.5% | Chemical formula 1 | 1% |
| Example II-12 | K-7 | Selosol 524 | 1.5% | Chemical formula 1 | 1% |
| Example II-13 | K-7 | Nopcoat PEM-17 | 1.5% | Chemical formula 1 | 1% |
| Comparative Example II-1 | K-7 | — | | Chemical formula 1 | 1% |
| Comparative Example II-2 | K-5 | — | | Chemical formula 2 | 1% |

TABLE 6-continued

| | Solvent | | | | | | | | |
|---|---|---|---|---|---|---|---|---|---|
| | $9 \leq$ SP value $\leq 11$ | | | | SP value $< 9$ or $11 <$ SP value | | | | |
| Example II-1 | iPDG | 30% | EHD | 2% | 2P | 6% | — | | |
| Example II-2 | iPDG | 30% | EHD | 2% | 2P | 6% | — | | |
| Example II-3 | B100 | 10% | EHD | 2% | 13BD | 10% | GLY | 16% | |
| Example II-4 | B100 | 10% | EHD | 2% | 13BD | 10% | GLY | 16% | |
| Example II-5 | B100 | 10% | EHD | 2% | 13BD | 10% | GLY | 16% | |
| Example II-6 | B100 | 10% | EHD | 2% | 13BD | 10% | GLY | 16% | |
| Example II-7 | B100 | 10% | EHD | 2% | 13BD | 10% | GLY | 16% | |
| Example II-8 | EHO | 15% | EHD | 2% | 13BD | 15% | 2P | 6% | |
| Example II-9 | EHO | 15% | EHD | 2% | 13BD | 15% | 2P | 6% | |
| Example II-10 | EHO | 15% | EHD | 2% | 13BD | 15% | 2P | 6% | |
| Example II-11 | EHO | 15% | EHD | 2% | 13BD | 15% | 2P | 6% | |
| Example II-12 | EHO | 15% | EHD | 2% | 13BD | 15% | 2P | 6% | |
| Example II-13 | EHO | 15% | EHD | 2% | 13BD | 15% | 2P | 6% | |
| Comparative Example II-1 | EHO | 15% | EHD | 2% | 13BD | 15% | 2P | 6% | |
| Comparative Example II-2 | B100 | 10% | EHD | 2% | 13BD | 10% | GLY | 16% | |

| | $9 \leq$ SP value $\leq 11$ | Wax:Solvent ($9 \leq$ SP value $\leq 11$) |
|---|---|---|
| Example II-1 | 78.9% | 1.0:20.0 |
| Example II-2 | 78.9% | 1.0:20.0 |
| Example II-3 | 26.3% | 1.0:6.7 |
| Example II-4 | 26.3% | 1.0:6.7 |
| Example II-5 | 26.3% | 1.0:6.7 |
| Example II-6 | 26.3% | 1.0:6.7 |
| Example II-7 | 26.3% | 1.0:6.7 |
| Example II-8 | 39.5% | 1.0:10.0 |
| Example II-9 | 39.5% | 1.0:10.0 |
| Example II-10 | 39.5% | 1.0:10.0 |
| Example II-11 | 39.5% | 1.0:10.0 |
| Example II-12 | 39.5% | 1.0:10.0 |
| Example II-13 | 39.5% | 1.0:10.0 |
| Comparative Example II-1 | 39.5% | — |
| Comparative Example II-2 | 26.3% | — |

TABLE 7

| | Storage stability | Discharging stability | Image Density | | Abrasion durability | |
|---|---|---|---|---|---|---|
| | | | Plain paper 1 | Plain paper 2 | Plain paper 1 | Plain paper 2 |
| Example II-1 | B | A | B | B | A | A |
| Example II-2 | A | A | B | A | A | B |
| Example II-3 | A | A | A | A | A | A |
| Example II-4 | A | A | A | B | A | A |
| Example II-5 | A | A | A | B | A | A |
| Example II-6 | A | A | A | B | A | A |
| Example II-7 | A | A | A | B | A | A |
| Example II-8 | A | A | A | A | A | B |
| Example II-9 | A | A | A | A | A | A |
| Example II-10 | A | A | A | A | A | B |
| Example II-11 | A | B | A | A | B | B |
| Example II-12 | A | B | A | A | B | B |
| Example II-13 | A | B | A | A | B | B |
| Comparative Example II-1 | A | B | A | B | C | D |
| Comparative Example II-2 | B | A | B | A | D | D |

Example III-1

After manufacturing a vehicle by dissolving the materials of the following recipe other than the pigment dispersion K-9 in deionized water, the vehicle was mixed with the pigment dispersion K-9 followed by filtration by a filter having an opening of 1 μm to obtain a black ink.

Ink Recipe
Pigment dispersion K-9: 40.0 parts
Methyltriglycol (SP value: 10.1): 6.0 parts
1,3-butane diol (SP value: 12.8): 15.0 parts
Glycerin (SP value: 16:4): 15.0 parts
2-ethyl-1,3-hexane diol (SP value: 11.1): 2.0 parts
Carnauba wax (Selosol 524, solid portion: 30 percent, manufactured by CHUKYO YUSHI CO., LTD.): 5.0 parts
Polyoxyethylene polyoxypropylene alkylether (EMALGEN LS-106, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 15.4 parts Example III-2

After manufacturing a vehicle by dissolving the materials of the following recipe other than the pigment dispersion K-10 in deionized water, the vehicle was mixed with the pigment dispersion K-10 followed by filtration by a filter having an opening of 1 μm to obtain a black ink.

Ink Recipe
Pigment dispersion K-10: 40.0 parts
3-ethyl-3-hydroxymethyl oxetane (SP value: 10.7): 17.0 parts
N-methyl-2-pyrroridone (SP value: 11.2): 19.0 parts
2-ethyl-1,3-hexane diol (SP value: 11.1): 2.0 parts
Carnauba wax (Selosol 524, solid portion: 30 percent, manufactured by CHUKYO YUSHI CO., LTD.): 5.0 parts
Polyoxyethylene polyoxypropylene alkylether (EMALGEN LS-106, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 15.4 parts Example III-3

After manufacturing a vehicle by dissolving the materials of the following recipe other than the pigment dispersion K-11 in deionized water, the vehicle was mixed with the pigment dispersion K-11 followed by filtration by a filter having an opening of 1 μm to obtain a black ink.

Ink Recipe
Pigment dispersion K-11: 40.0 parts
Tripropylene glycol mono-methyl ether (SP value: 9.4): 21.0 parts
3-methyl-1,3-butane diol (SP value: 12.1): 10.0 parts
1,2-hexane diol (SP value: 11.8): 5.0 parts
2-ethyl-1,3-hexane diol (SP value: 11.1): 2.0 parts
Carnauba wax (Selosol 524, solid portion: 30 percent, manufactured by CHUKYO YUSHI CO., LTD.): 5.0 parts
Surfactant represented by the Chemical formula 2: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 15.4 parts

Example III-4

After manufacturing a vehicle by dissolving the materials of the following recipe other than the pigment dispersion K-8 in deionized water, the vehicle was mixed with the pigment dispersion K-8 followed by filtration by a filter having an opening of 1 μm to obtain a black ink.
Ink Recipe
Pigment dispersion K-8: 40.0 parts
3-ethyl-3-hydroxymethyl oxetane (SP value: 10.7): 36.0 parts
2-ethyl-1,3-hexane diol (SP value: 11.1): 2.0 parts
Polyethylene wax (AQUACER 515, solid portion: 35 percent, manufactured by BYK Chemie Japan): 4.3 parts
Surfactant represented by the Chemical formula 1: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.1 parts

Example III-5

A cyan ink was prepared in the same manner and recipe as in Example III-4 except that the pigment dispersion K-8 was changed to the pigment dispersion C-3.

Example III-6

A magenta ink was prepared in the same manner and recipe as in Example III-4 except that the pigment dispersion K-8 was changed to the pigment dispersion M-3.

Example III-7

A yellow ink was prepared in the same manner and recipe as in Example III-4 except that the pigment dispersion K-8 was changed to the pigment dispersion Y-3.

Example III-8

After manufacturing a vehicle by dissolving the materials of the following recipe other than the pigment dispersion K-12 in deionized water, the vehicle was mixed with the pigment dispersion K-12 followed by filtration by a filter having an opening of 1 μm to obtain a black ink.
Ink Recipe
Pigment dispersion K-12: 40.0 parts
Isopropylidene glycerol (SP value: 9.8): 13.0 parts
N,N-dimethyl-β-methoxy propionamide (EQUAMIDE™ M100, SP value: 10.3, manufactured by Idemitsu Kosan Co., Ltd.): 18.0 parts
2-pyrroridone (SP value: 11.2): 5.0 parts
2-ethyl-1,3-hexane diol (SP value: 11.1): 2.0 parts
Polyolefin wax (Nopcoat PEM-17, solid portion: 40 percent, manufactured by SAN NOPCO LIMITED): 3.8 parts
Polyoxyethylene polyoxypropylene alkylether (EMALGEN LS-106, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.6 parts

Example III-9

After manufacturing a vehicle by dissolving the materials of the following recipe other than the pigment dispersion K-13 in deionized water, the vehicle was mixed with the pigment dispersion K-13 followed by filtration by a filter having an opening of 1 μm to obtain a black ink.
Ink Recipe
Pigment dispersion K-13: 40.0 parts
N,N-dimethyl-β-butoxy propionamide (EQUAMIDE™ B 100, SP value: 9.8, manufactured by Idemitsu Kosan Co., Ltd.): 15.0 parts
1,3-butane diol (SP value: 12.8): 21.0 parts
2-ethyl-1,3-hexane diol (SP value: 11.1): 2.0 parts
Polyethelene wax (HYTEC E-8237, solid portion: 40 percent, manufactured by TOHO Chemical Industry Co., Ltd.): 3.8 parts
Surfactant represented by the Chemical formula 2: 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water: 16.6 parts

Example III-10

A black ink was prepared in the same manner and recipe as in Example III-9 except that the pigment dispersion K-13 was changed to the pigment dispersion K-14.

Example III-11

A black ink was prepared in the same manner and recipe as in Example III-9 except that the pigment dispersion K-13 was changed to the pigment dispersion K-15.

Example III-12

After manufacturing a vehicle by dissolving the materials of the following recipe other than the pigment dispersion K-3 in deionized water, the vehicle was mixed with the pigment dispersion K-3 followed by filtration by a filter having an opening of 1 μm to obtain a black ink.
Ink Recipe
Pigment dispersion K-3: 40.0 parts
Copolymer 1: 15.0 parts
Isopropylidene glycerol (SP value: 9.8): 13.0 parts
N,N-dimethyl-β-methoxy propionamide (EQUAMIDE™ M100, SP value: 10.3, manufactured by Idemitsu Kosan Co., Ltd.): 18.0 parts
2-pyrroridone (SP value: 11.2): 5.0 parts
2-ethyl-1,3-hexane diol (SP value: 11.1): 2.0 parts
Polyethylene wax (AQUACER 531, solid portion: 45 percent, manufactured by BYK Chemie Japan): 3.3 parts
Polyoxyethylene polyoxypropylene alkylether (EMALGEN LS-106, manufactured by KAO CORPORATION): 1.0 part
2-amino-2-ethyl-1,3-propane diol: 0.5 parts
Preservatives and fungicides (PROXEL™ LV, manufactured by ARCH CHEMICALS JAPAN, INC.): 0.1 parts
Deionized water 2.1 parts

Comparative Example III-1

A magenta ink was obtained in the same recipe and manner as those in Example III-6 except that 36.0 parts of 3-ethyl-3-hydroxymethyl oxetane (SP value: 10.7) was changed to 36.0 parts of 1,3-butanediol (SP value: 12.8).

Comparative Example III-2

A black ink was obtained in the same recipe and manner as those in Example III-10 except that 15.0 parts of N,N- dimethyl-β-butoxy propionamide (SP value: 9.8) was changed to 3.0 parts of N,N-dimethyl-β-butoxy propionamide (SP value: 9.8) and 12.0 parts of 2-pyrolidone (SP value: 11.2).

Comparative Example III-3

A black ink was obtained in the same recipe and manner as those in Example III-3 except that 5.0 parts of carnauba wax (Selosol 524, solid portion: 30 percent, manufactured by CHUKYO YUSHI CO., LTD.) was reduced to 2.0 parts and 3.0 parts of deionized water was added.

Comparative Example III-4

A black ink was obtained in the same recipe and manner as those in Example III-2 except that 5.0 parts of carnauba wax (Selosol 524, solid portion: 30 percent, manufactured by CHUKYO YUSHI CO., LTD.) was changed to 5.0 parts of deionized water.

The ink recipes of Examples III-1 to III-12 and Comparative Examples III-1 to III-4 are shown in Table 8 and the evaluation results are shown in Table 9.

TABLE 8

|  | Dispersion | Wax |  | Surfactant |  |
|---|---|---|---|---|---|
| Example III-1 | K-9 | Selosol 524 | 1.5% | LS-106 | 1% |
| Example III-2 | K-10 | Selosol 524 | 1.5% | LS-106 | 1% |
| Example III-3 | K-11 | Selosol 524 | 1.5% | Chemical formula 2 | 1% |
| Example III-4 | K-8 | AQUACER 515 | 1.5% | Chemical formula 1 | 1% |
| Example III-5 | C-3 | AQUACER 515 | 1.5% | Chemical formula 1 | 1% |
| Example III-6 | M-3 | AQUACER 515 | 1.5% | Chemical formula 1 | 1% |
| Example III-7 | Y-3 | AQUACER 515 | 1.5% | Chemical formula 1 | 1% |
| Example III-8 | K-12 | Nopcoat PEM-17 | 1.5% | LS-106 | 1% |
| Example III-9 | K-13 | HYTEC E-8237 | 1.5% | Chemical formula 2 | 1% |
| Example III-10 | K-14 | HYTEC E-8237 | 1.5% | Chemical formula 2 | 1% |
| Example III-11 | K-15 | HYTEC E-8237 | 1.5% | Chemical formula 2 | 1% |
| Example III-12 | K-3 | AQUACER 531 | 1.5% | LS-106 | 1% |
| Comparative Example III-1 | M-3 | AQUACER 515 | 1.5% | Chemical formula 1 | 1% |
| Comparative Example III-2 | K-14 | HYTEC E-8237 | 1.5% | Chemical formula 2 | 1% |
| Comparative Example III-3 | K-11 | Selosol 524 | 0.6% | Chemical formula 2 | 1% |
| Comparative Example III-4 | K-10 | — | — | LS-106 | 1% |

|  | Solvent | | | | | | | |
|---|---|---|---|---|---|---|---|---|
|  | 9 ≤ SP value ≤ 11 | | | | SP value < 9 or 11 < SP value | | | |
| Example III-1 | — | | MTG | 6% | EHD | 2% 13BD | 15% GLY | 15% |
| Example III-2 | EHO | 17% | — | | EHD | 2% NMP | 19% | — |
| Example III-3 | — | | MTFG | 21% | EHD | 2% MBD | 10% 12HD | 5% |
| Example III-4 | EHO | 36% | — | | EHD | 2% | — | — |
| Example III-5 | EHO | 36% | — | | EHD | 2% | — | — |
| Example III-6 | EHO | 36% | — | | EHD | 2% | — | — |
| Example III-7 | EHO | 36% | — | | EHD | 2% | — | — |
| Example III-8 | IPG | 13% | M100 | 18% | EHD | 2% 2P | 5% | — |
| Example III-9 | B100 | 15% | — | | EHD | 2% 13BD | 21% | — |
| Example III-10 | B100 | 15% | — | | EHD | 2% 13BD | 21% | — |
| Example III-11 | B100 | 15% | — | | EHD | 2% 13BD | 21% | — |
| Example III-12 | IPG | 13% | M100 | 18% | EHD | 2% 2P | 5% | — |
| Comparative Example III-1 | — | | — | | EHD | 2% 13BD | 36% | — |
| Comparative Example III-2 | B100 | 3% | — | | EHD | 2% 13BD | 21% 2P | 12% |
| Comparative Example III-3 | — | | MFTG | 21% | EHD | 2% MBD | 10% 12HD | 5% |
| Comparative Example III-4 | EHO | 17% | — | | EHD | 2% NMP | 19% | — |

|  | 9 ≤ SP value ≤ 11 Solvent content ratio | Wax:Solvent (9 ≤ SP value ≤ 11) |
|---|---|---|
| Example III-1 | 15.8% | 1.0:4.0 |
| Example III-2 | 44.7% | 1.0:11.3 |
| Example III-3 | 55.3% | 1.0:14.0 |
| Example III-4 | 94.7% | 1.0:23.9 |

TABLE 8-continued

| Example III-5 | 94.7% | 1.0:23.9 |
| Example III-6 | 94.7% | 1.0:23.9 |
| Example III-7 | 94.7% | 1.0:23.9 |
| Example III-8 | 81.6% | 1.0:20.7 |
| Example III-9 | 39.5% | 1.0:10.0 |
| Example III-10 | 39.5% | 1.0:10.0 |
| Example III-11 | 39.5% | 1.0:10.0 |
| Example III-12 | 81.6% | 1.0:20.7 |
| Comparative Example III-1 | 0.0% | 1.0:0.0 |
| Comparative Example III-2 | 8.3% | 1.0:2.0 |
| Comparative Example III-3 | 55.3% | 1.0:35.0 |
| Comparative Example III-4 | 44.7% | 1.0:∞ |

TABLE 9

| | Storage Stability | Discharging stability | Image density/Saturation | | Abrasion resistance | |
| --- | --- | --- | --- | --- | --- | --- |
| | | | Plain paper 1 | Plain paper 2 | Plain paper 1 | Plain paper 2 |
| Example III-1 | A | B | B | B | A | B |
| Example III-2 | A | B | B | A | A | B |
| Example III-3 | A | B | B | B | A | B |
| Example III-4 | A | A | A | A | A | A |
| Example III-5 | A | A | A | A | A | A |
| Example III-6 | A | A | A | A | A | A |
| Example III-7 | A | A | A | A | A | A |
| Example III-8 | A | B | A | A | A | B |
| Example III-9 | A | A | A | A | A | A |
| Example III-10 | A | A | A | A | A | A |
| Example III-11 | A | A | B | A | A | A |
| Example III-12 | A | A | B | A | A | A |
| Comparative Example III-1 | C | D | B | A | B | B |
| Comparative Example III-2 | C | D | C | B | A | B |
| Comparative Example III-3 | B | C | C | B | B | D |
| Comparative Example III-4 | C | B | B | B | D | D |

As seen in the results, the ink of the present disclosure has excellent abrasion resistance, a high level of image density, and an excellent saturation on plain paper also with an excellent discharging stability and furthermore an excellent stability.

According to the present invention, an ink is provided that improves the fixability on plain paper, which is not satisfied by typical pigment inks, imparts excellent abrasion resistance to an image having a high density and a high saturation while having excellent storage stability and discharging stability.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
a pigment;
a wax;
a water soluble solvent comprising a solvent having an SP value of from 9.0 to 11.0;
a copolymer; and
water:
wherein:
a mass ratio of a content of the wax in the ink to a content of the solvent having an SP value of from 9.0 to 11.0 is in a range of from 1.0:2.5 to 1.0:25.0; and
the copolymer comprises a structure unit represented by Chemical Formula I and a structure unit represented by Chemical Formula II:

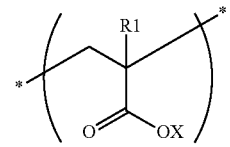

Chemical formula I

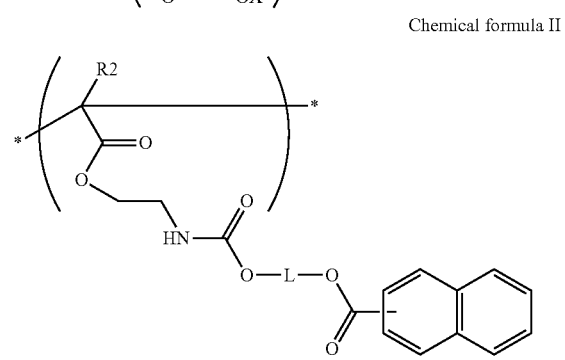

Chemical formula II where each R1 independently represents a hydrogen atom or a methyl group, R2 represents a hydrogen atom or a methyl group, each X independently represents a hydrogen atom or a cation and L represents an alkylene group having 2 to 18 carbon atoms.

2. The ink according to claim 1, wherein a ratio of the solvent having an SP value of from 9.0 to 11.0 to a total content of the water soluble solvent in the ink is 80 percent by mass or greater.

3. The ink according to claim 1, wherein the solvent having an SP value of from 9.0 to 11.0 comprises at least one member selected from the group consisting of isopropylidene glycerol, 3-ethyl-3-hydroxymethyloxetane, and N,N-dimethyl-β-butoxypropionamide.

4. The ink according to claim 1, wherein a molar ratio of the structure unit represented by Chemical formula I to the structure unit represented by Chemical formula II is from 0.5:1.0 to 3.0:1.0.

5. The ink according to claim 1, wherein a surface of the pigment is chemically modified by a neutralized phosphoric acid group or a neutralized bisphosphonic acid group.

6. The ink according to claim 1, wherein the pigment is dispersed in the ink by the copolymer.

7. The ink according to claim 1, wherein the wax comprises a polyethylene wax having a melting point of from 100 degrees C. to 140 degrees C.

8. The ink according to claim 1, wherein the wax comprises a polyethylene wax having a volume average particle diameter of from 20 nm to 150 nm.

9. The ink according to claim 1, further comprising at least one compound according to at least one of Chemical formula 1 and Chemical formula 2:

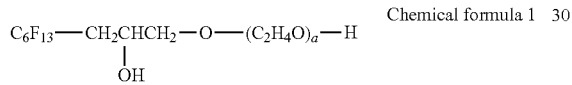

Chemical formula 1 where a represents a numeral in a range of from 8 to 9, and

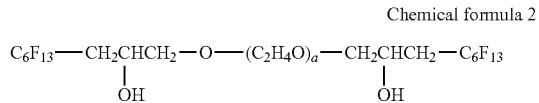

Chemical formula 2 where a represents a numeral in a range of from 8 to 9.

10. An ink container comprising:
an ink containing unit; and
the ink of claim 1 contained in the ink containing unit.

11. An inkjet recording device comprising:
an ink container that contains the ink of claim 1; and
a recording head to discharge the ink supplied from the ink container.

12. Recorded matter comprising:
a recording medium; and
an image formed on the recording medium using the ink of claim 1.

13. An ink comprising:
a pigment;
a wax;
a water soluble solvent including a solvent having an SP value of from 9.0 to 11.0;
a fluorine-containing surfactant; and
water;
wherein:
a mass ratio of a content of the wax in the ink to a content of the solvent having an SP value of from 9.0 to 11.0 is in a range of from 1.0:2.5 to 1.0:25.0; and
the fluorine-containing surfactant comprises at least one compound according to at least one of Chemical formula 1 and Chemical formula 2:

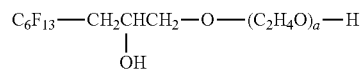

Chemical formula 1 where a represents a numeral in a range of from 8 to 9; and

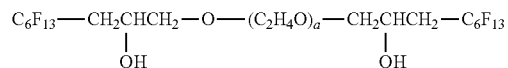

Chemical formula 2 where a represents a numeral in a range of from 8 to 9.

14. The ink according to claim 13, wherein a ratio of the solvent having an SP value of from 9.0 to 11.0 to a total content of the water soluble solvent in the ink is 80 percent by mass or greater.

15. The ink according to claim 13, wherein the solvent having an SP value of from 9.0 to 11.0 comprises at least one member selected from the group consisting of isopropylidene glycerol, 3-ethyl-3-hydroxymethyloxetane, and N,N-dimethyl-β-butoxypropionamide.

16. The ink according to claim 13, wherein a surface of the pigment is chemically modified by a neutralized phosphoric acid group or a neutralized bisphosphonic acid group.

17. The ink according to claim 13, wherein the wax comprises a polyethylene wax having a melting point of from 100 degrees C. to 140 degrees C.

18. The ink according to claim 13, wherein the wax comprises a polyethylene wax having a volume average particle diameter of from 20 nm to 150 nm.

19. Recorded matter comprising:
a recording medium; and
an image formed on the recording medium using the ink of claim 13.

* * * * *